US012045989B2

(12) United States Patent
Ono

(10) Patent No.: US 12,045,989 B2
(45) Date of Patent: Jul. 23, 2024

(54) REGION EXTRACTION DEVICE, METHOD THEREOF, OBJECT DETECTION APPARATUS, AND METHOD THEREOF

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 462 days.

(21) Appl. No.: 17/372,543

(22) Filed: Jul. 12, 2021

(65) Prior Publication Data
US 2022/0067942 A1 Mar. 3, 2022

(30) Foreign Application Priority Data

Aug. 28, 2020 (JP) ................. 2020-144174

(51) Int. Cl.
G06T 7/11 (2017.01)
G06V 10/143 (2022.01)
(Continued)

(52) U.S. Cl.
CPC .............. *G06T 7/11* (2017.01); *G06V 10/443* (2022.01); *G06V 10/56* (2022.01); *G06V 20/52* (2022.01);
(Continued)

(58) Field of Classification Search
CPC ........ G06T 7/11; G06V 10/443; G06V 10/56; G06V 20/52; G06V 10/58; G06V 10/143;
(Continued)

(56) References Cited

U.S. PATENT DOCUMENTS

| 6,024,202 A | 2/2000 | Potter | |
|---|---|---|---|
| 2013/0063624 A1* | 3/2013 | Lin | H04N 23/60 348/E5.031 |

FOREIGN PATENT DOCUMENTS

| JP | 2001516012 | 9/2001 |
|---|---|---|
| JP | 2014032436 | 2/2014 |

(Continued)

OTHER PUBLICATIONS

"Search Report of Europe Counterpart Application", dated Jan. 26, 2022, pp. 1-11.

(Continued)

Primary Examiner — Jon Chang
(74) Attorney, Agent, or Firm — JCIPRNET

(57) ABSTRACT

A region extraction device and a method thereof in a stage previous to detection of a target object, capable of appropriately extracting a region having a possibility of presence of a target object emitting light having a light emission spectrum of a specific narrowband as a determination region in an imaging region, and an object detection apparatus and a method thereof capable of efficiently detecting the target object using a region extraction result are provided.

In a region extraction method, a plurality of images including an image of a second narrowband corresponding to a first narrowband of light emitted by a target object and an image of a third narrowband different from the second narrowband are acquired from a multispectral camera. Next, a region that emits light having a light emission spectrum other than a light emission spectrum of the first narrowband is determined as a non-determination region in an imaging region based on the plurality of acquired images, and one or a plurality of regions excluding the non-determination region from the imaging region are extracted as a determination region.

13 Claims, 21 Drawing Sheets

(51) Int. Cl.
*G06V 10/25* (2022.01)
*G06V 10/44* (2022.01)
*G06V 10/56* (2022.01)
*G06V 20/52* (2022.01)
*G06V 20/58* (2022.01)
*G06V 10/58* (2022.01)

(52) U.S. Cl.
CPC ............ *G06V 10/143* (2022.01); *G06V 10/25* (2022.01); *G06V 10/58* (2022.01); *G06V 20/584* (2022.01)

(58) Field of Classification Search
CPC ...... G06V 10/25; G06V 10/764; G06V 20/54; G06V 20/584; G01J 3/2823
See application file for complete search history.

(56) References Cited

FOREIGN PATENT DOCUMENTS

| | | | |
|---|---|---|---|
| JP | 2020104667 A | * | 7/2020 |
| WO | WO-2006113996 A1 | * | 11/2006 ................ G01J 3/02 |

OTHER PUBLICATIONS

Chunhe Yu et al., "Traffic light detection during day and night conditions by a camera", IEEE 10th International Conference on Signal Processing Proceedings, Oct. 2010, pp. 821-824.
Heekang Kim et al., "Hyperspectral Image-Based Night-Time Fire Detection Using NKNBD", 2018 7th International Congress on Advanced Applied Informatics (IIAI-AAI), Jul. 2018, pp. 974-975.
Takumi Karasawa et al., "Multispectral Object Detection for autonomous vehicles", Thematic Workshops'17, Oct. 2017, pp. 35-43.
Theo Gevers et al., "Color-based object recognition", Pattern Recognition, vol. 32, Mar. 1999, pp. 453-464.
Nahum Gat et al., "Imaging spectroscopy using tunable filters: a review", Proceedings of SPIE, vol. 4056, Apr. 2000, pp. 50-64.
"Office Action of Europe Counterpart Application", dated Nov. 30, 2023, pp. 1-5.

* cited by examiner

FIG. 21
(A) 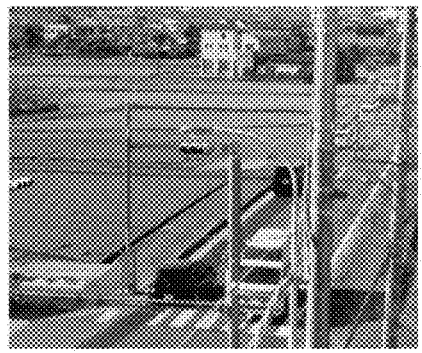
(B) 
(C) 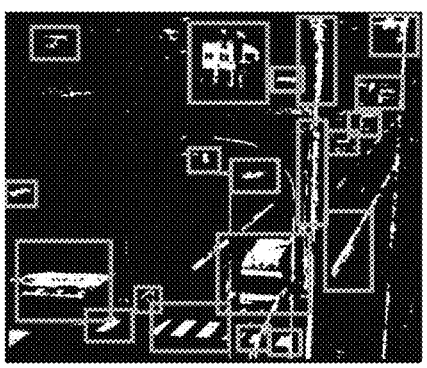
(D) 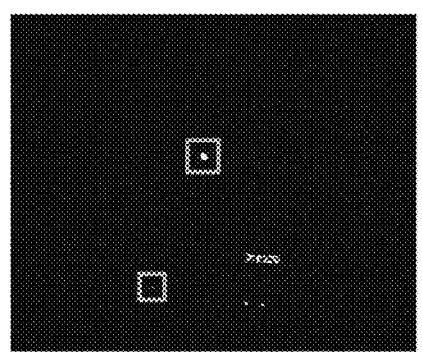

REGION EXTRACTION DEVICE, METHOD THEREOF, OBJECT DETECTION APPARATUS, AND METHOD THEREOF

CROSS-REFERENCE TO RELATED APPLICATION

The present application claims priority under 35 U.S.C § 119(a) to Japanese Patent Application No. 2020-144174 filed on Aug. 28, 2020, which is hereby expressly incorporated by reference, in its entirety, into the present application.

BACKGROUND OF THE INVENTION

1. Field of the Invention

The present invention relates to a region extraction device, a method thereof, an object detection apparatus, and a method thereof and particularly, to a technology for extracting a region having a possibility of presence of a target object as a determination region in an imaging region and a technology for detecting the target object using an extraction result.

2. Description of the Related Art

A technology for detecting only a target object that emits light having a specific wavelength has been required.

For example, a camera and an image recognition technology capable of automatically recognizing a traffic signal in which light emitting diodes (LEDs) have been widely used are expected as a surveillance camera at an intersection and a vehicle-mounted camera of an automatic driving automobile.

JP2014-32436A discloses a surveillance camera device that detects a blue signal lamp, a yellow signal lamp, and a red signal lamp of a traffic signal configured with LEDs.

The surveillance camera disclosed in JP2014-32436A includes a signal lamp detection section that detects turn-on of a signal lamp of a traffic signal configured with an LED in an imaging region of a solid-state imaging element, a turn-on/turn-off region detection section that detects a turn-on/turn-off region in which turn-on→turn-off→turn-on of each detected signal lamp is periodically repeated, and an RGB ratio detection section that detects a ratio of RGB signals of the turn-on/turn-off regions output from the turn-on/turn-off region detection section, in which regions indicated by xy coordinate values of three pixels that are arranged in series in a horizontal direction or a vertical direction in the imaging region and periodically repeat turn-on/turn-off are used as regions in which a red signal lamp, a yellow signal lamp, and a blue signal lamp are present, and the red signal lamp, the yellow signal lamp, and the blue signal lamp are specified from a ratio of color signals (RGB signals) of red (R), green (G), and blue (B) of the solid-state imaging element in the three turn-on/turn-off regions that are turned on/turned off.

In addition, JP2001-516012A discloses a technology for sorting a true object and a false object of bills, securities, or the like.

Special ink that radiates (reflects) light of a specific narrowband is present in the true object of bills, securities, or the like. In the method disclosed in JP2001-516012A, presence of radiation of the specific narrowband (presence of the special ink) is decided by performing detection of a radiation in a first wavelength range including the specific narrowband and other wavelengths and detection of a radiation in a second wavelength range substantially including only the other wavelengths and comparing levels of the two detected radiations.

SUMMARY OF THE INVENTION

The surveillance camera disclosed in JP2014-32436A detects the regions in which the blue signal lamp, the yellow signal lamp, and the red signal lamp are present, using sequential turn-on/turn-off of the blue signal lamp, the yellow signal lamp, and the red signal lamp of the traffic signal. In the invention disclosed in JP2014-32436A, a detection target object is limited to an object that is present at the same position in the imaging region, such as the traffic signal imaged by the surveillance camera.

In addition, the method disclosed in JP2001-516012A is a method of sorting the true object and the false object of bills, securities, or the like. A target object to be particularly detected is the special ink that is used in the true object of bills or the like and radiates the light of the specific narrowband, and a position at which the special ink is to be present is limited.

That is, in any of the technologies disclosed in JP2014-32436A and JP2001-516012A, it is assumed that the target object is present at a specific position in the imaging region, and a target object present at any position in the imaging region cannot be detected.

The present invention is conceived in view of such matters, and an object thereof is to provide a region extraction device and a method thereof in a stage previous to detection of a target object, capable of appropriately extracting a region having a possibility of presence of a target object emitting light having a light emission spectrum of a specific narrowband as a determination region in an imaging region, and an object detection apparatus and a method thereof capable of efficiently detecting the target object using a region extraction result.

In order to accomplish the object, an invention according to a first aspect is a region extraction device comprising a processor configured to extract a region having a possibility of presence of a target object as a determination region in an imaging region, in which the target object emits light having a light emission spectrum of a first narrowband, and the processor is configured to perform image acquisition processing of acquiring a plurality of images including an image of a second narrowband corresponding to the first narrowband and an image of a third narrowband different from the second narrowband from a multispectral camera, non-determination region decision processing of detecting a region emitting light having a light emission spectrum other than the light emission spectrum of the first narrowband in the imaging region and deciding the detected region as a non-determination region based on images other than the image of the second narrowband among the plurality of images, and determination region extraction processing of extracting one or a plurality of regions excluding the non-determination region from the imaging region as the determination region.

According to the first aspect of the present invention, a region (that is, a region that does not have the light emission spectrum of the first narrowband emitted or reflected by the target object) that does not emit or reflect light having the light emission spectrum of the first narrowband is detected in the imaging region based on the images other than the image of the second narrowband among the plurality of images. In the region detected in such a manner, at least light of a light emission spectrum different from light of a light emission spectrum of the target object, and thus, the target object is not present. Therefore, the region in which the target object is not present is regarded as the non-determination region and excluded from the region having the possibility of presence of the target object. That is, the remaining region excluding the non-determination region from the imaging region is extracted as the region (determination region) having the possibility of presence of the target object.

Detection performance for the target object is "improved" by narrowing down the determination region having the possibility of presence of the target object as preprocessing of detection processing of the target object.

Here, "improved" includes performance improvement in two aspects of (a) since a "false object" present in the non-determination region is originally excluded from a determination target, erroneous detection is not performed (suppression of erroneous detection), and (b) since the number of determination regions is decreased (carefully selected) in the imaging region, a processing time period of determination processing of the target object is reduced (shortening of the processing time period).

In the region extraction device according to a second aspect of the present invention, it is preferable that a central wavelength of the second narrowband is within a range of less than a half-width of the light emission spectrum of the first narrowband from a central wavelength of the first narrowband, and a central wavelength of the third narrowband is separated by more than or equal to the half-width of the light emission spectrum of the first narrowband from the central wavelength of the second narrowband.

In the region extraction device according to a third aspect of the present invention, it is preferable that the central wavelength of the second narrowband matches the central wavelength of the first narrowband, and a bandwidth of the second narrowband is within a bandwidth of the first narrowband. Matching between the central wavelength of the second narrowband and the central wavelength of the first narrowband is not limited to a case of complete matching and includes a case of approximate matching.

In the region extraction device according to a fourth aspect of the present invention, it is preferable that the target object causes a flicker having a frequency corresponding to a frequency of a commercial power supply, and in the non-determination region decision processing, a region in which the flicker does not occur in the imaging region is set as the non-determination region.

In the region extraction device according to a fifth aspect of the present invention, it is preferable that in the non-determination region decision processing, a region of lower one-third of the imaging region is set as the non-determination region. For example, in a case of imaging forward using a vehicle-mounted multispectral camera, a traffic signal is normally not present in the region of lower one-third of an imaging region of the vehicle-mounted camera.

In the region extraction device according to a sixth aspect of the present invention, it is preferable that the target object is a light emitting object including a light emitting diode. For example, a traffic signal configured with light emitting diodes can be used as the target object.

An object detection apparatus according to a seventh aspect of the present invention comprises the region extraction device, in which the processor is configured to perform determination processing of determining whether or not an object in the determination region is the target object based on images of a plurality of narrowbands including the image of the second narrowband and the image of the third narrowband.

In the object detection apparatus according to an eighth aspect of the present invention, it is preferable that in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, the image of the third narrowband and the image of the fourth narrowband in the determination region are subtracted from the image of the second narrowband in the determination region, and a determination as to whether or not the object in the determination region is the target object is performed based on a subtraction result obtained by the subtraction.

According to the eighth aspect of the present invention, by subtracting both of the image of the third narrowband and the image of the fourth narrowband adjacent to the second narrowband from the image of the second narrowband, only the target object emitting light of the light emission spectrum of the first narrowband can be favorably detected.

In the object detection apparatus according to a ninth aspect of the present invention, it is preferable that in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, a sum-product operation is performed using the image of the second narrowband, the image of the third narrowband, and the image of the fourth narrowband in the determination region, and a weight coefficient set for each image, and a determination as to whether or not the object in the determination region is the target object is performed based on an operation result obtained by the sum-product operation.

According to the ninth aspect of the present invention, by performing the sum-product operation using three images including the image of the second narrowband, the image of the third narrowband, and the image of the fourth narrowband in the determination region and the weight coefficient set for each image, only the target object emitting light of the light emission spectrum of the first narrowband can be more favorably detected.

In the object detection apparatus according to a tenth aspect of the present invention, it is preferable that in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, a sum-product operation is performed using the image of the second narrowband, the image of the third narrowband, and the image of the fourth narrowband in the determination region, and a weight coefficient set for each image, a non-linear operation is further performed on an operation result obtained by the sum-product operation, and a determination as to whether or not the object in the determination region is the target object is performed based on a result of the non-linear operation.

According to the tenth aspect of the present invention, by performing the sum-product operation using three images including the image of the second narrowband, the image of the third narrowband, and the image of the fourth narrowband in the determination region and the weight coefficient set for each image, and further performing the non-linear operation on the operation result obtained by the sum-product operation, only the target object emitting light of the light emission spectrum of the first narrowband can be further favorably detected.

In the object detection apparatus according to an eleventh aspect of the present invention, it is preferable that in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and the determination processing is processing based on a learned model that takes input of the image of the second narrowband, the image of the third narrowband, and the image of the fourth narrowband in the determination region and outputs a determination result as to whether or not the object in the determination region is the target object.

In the object detection apparatus according to a twelfth aspect of the present invention, it is preferable that the target object is a blue signal lamp, a yellow signal lamp, and a red signal lamp of a traffic signal, in the image acquisition processing, images of a plurality of narrowbands including images of three narrowbands respectively corresponding to light emission spectra of light emitted by the blue signal lamp, the yellow signal lamp, and the red signal lamp and images of three or more narrowbands different from the three narrowbands are acquired from the multispectral camera, and the processor is configured to detect which signal lamp of the traffic signal emits light based on images of six or more narrowbands.

An invention according to a thirteenth aspect is a region extraction method performed by a processor configured to extract a region having a possibility of presence of a target object as a determination region in an imaging region, in which the target object emits light having a light emission spectrum of a first narrowband, the region extraction method comprises a step of acquiring a plurality of images including an image of a second narrowband corresponding to the first narrowband and an image of a third narrowband different from the second narrowband from a multispectral camera, a step of detecting a region emitting light having a light emission spectrum other than the light emission spectrum of the first narrowband in the imaging region and deciding the detected region as a non-determination region based on images other than the image of the second narrowband among the plurality of images, and a step of extracting one or a plurality of regions excluding the non-determination region from the imaging region as the determination region.

An object detection method according to a fourteenth aspect of the present invention comprises the region extraction method, in which the processor determines whether or not an object in the determination region is the target object based on images of a plurality of narrowbands including the image of the second narrowband and the image of the third narrowband.

According to the present invention, the region having the possibility of presence of the target object that emits light having a light emission spectrum of a specific narrowband can be appropriately extracted as the determination region in the imaging region. In addition, by performing this extraction processing of the determination region as the preprocessing of the detection processing of the target object, the target object emitting light having the light emission spectrum of the specific narrowband can be efficiently detected in the imaging region.

BRIEF DESCRIPTION OF THE DRAWINGS

FIG. 21 is a diagram illustrating various images and the like during detection of the target object according to the comparative example.

DESCRIPTION OF THE PREFERRED EMBODIMENTS

Hereinafter, a preferred embodiment of a region extraction device, a method thereof, an object detection apparatus, and a method thereof according to the embodiment of the present invention will be described in accordance with the appended drawings.

Figure 1:
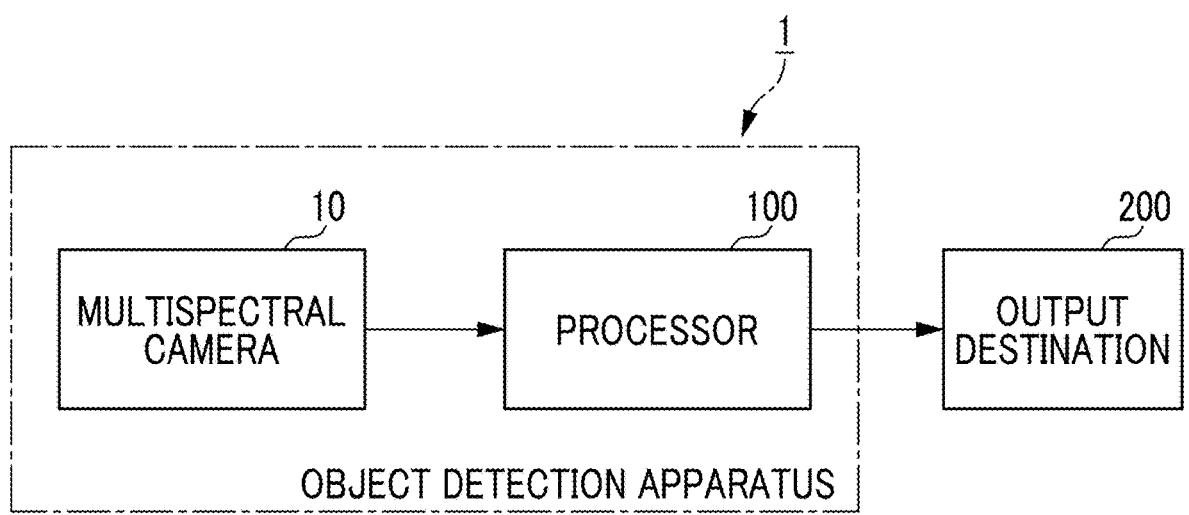
FIG. 1 is a schematic configuration diagram illustrating an embodiment of an object detection apparatus according to an embodiment of the present invention.

FIG. 1 is a schematic configuration diagram illustrating an embodiment of the object detection apparatus according to the embodiment of the present invention.

An object detection apparatus 1 illustrated in FIG. 1 is configured to include the region extraction device according to the embodiment of the present invention.

As illustrated in FIG. 1, the object detection apparatus 1 is configured with a multispectral camera 10 and a processor 100. The object detection apparatus 1 detects a target object that emits or reflects light in a wavelength of a specific narrowband. In the present example, a blue signal lamp, a yellow signal lamp, and a red signal lamp of a traffic signal configured with light emitting diodes (LEDs) are used as the target object of detection.

A blue LED, a yellow LED, and a red LED used in the traffic signal have light emission center wavelengths of 503 nm, 592 nm, and 630 nm, respectively, and each emit light of a light emission spectrum in a narrowband having a wavelength width of approximately 30 to 50 nm.

The multispectral camera 10 includes a plurality of narrowband filters that selectively allow transmission of light of a plurality of narrowbands, respectively, including each light emission band of the blue LED, the yellow LED, and the red LED, and captures a plurality of images respectively transmitted through the plurality of narrowband filters at the same time.

Multispectral Camera

Figure 2:
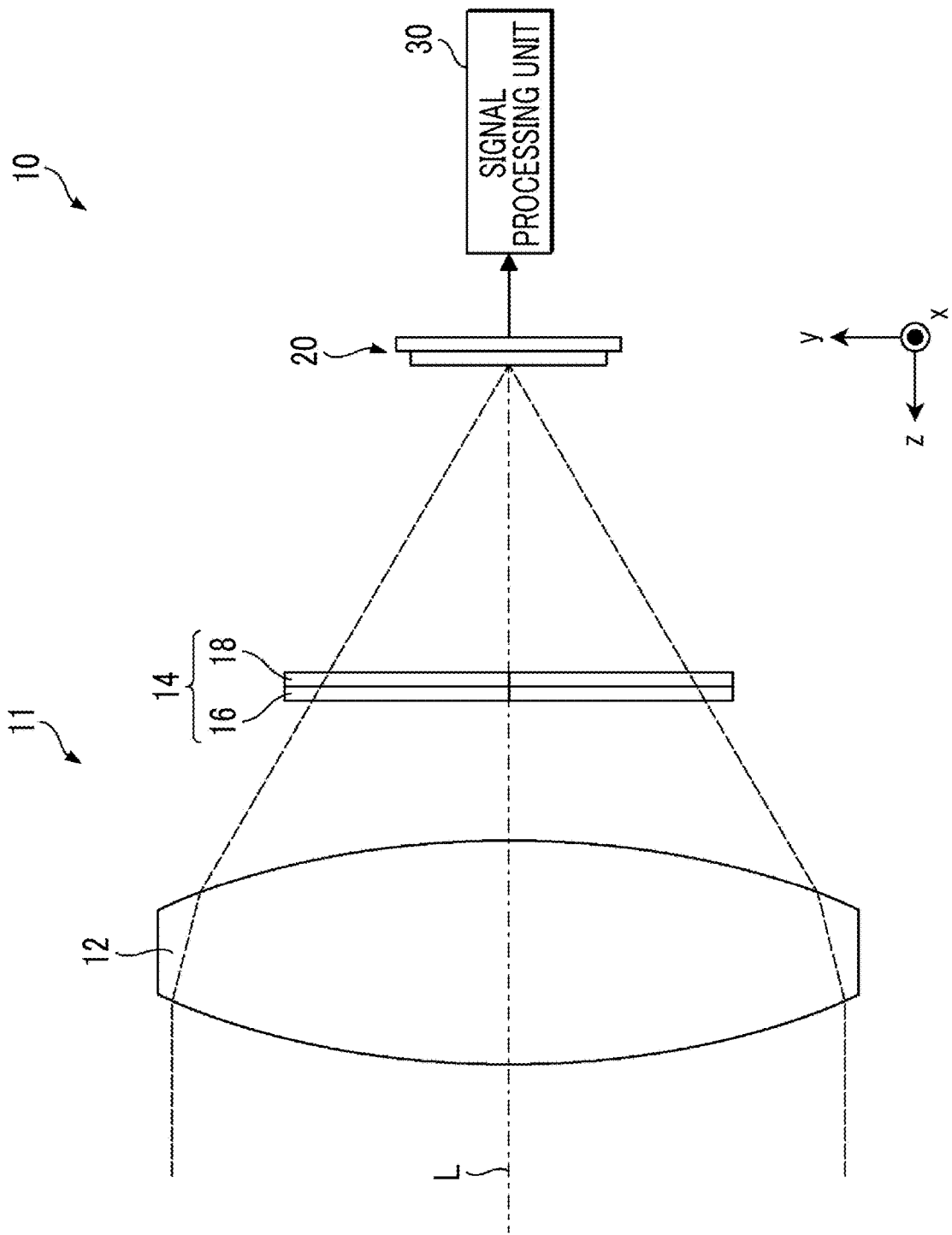
FIG. 2 is a schematic diagram illustrating an embodiment of a multispectral camera.

FIG. 2 is a schematic diagram illustrating an embodiment of the multispectral camera.

The multispectral camera 10 illustrated in FIG. 2 comprises an imaging optical system 11, an image sensor 20, and a signal processing unit 30.

Imaging Optical System

The imaging optical system 11 comprises a lens 12 and a pupil division filter 14. The lens 12 causes an optical image of a subject including the target object to be formed on a light-receiving surface of the image sensor 20.

The pupil division filter 14 is comprised at or in a vicinity of a pupil position of the imaging optical system 11 and divides a pupil part of the imaging optical system 11 into nine optical regions. The pupil division filter 14 is configured by superimposing a narrowband filter 16 and a polarization filter 18.

Figure 3:
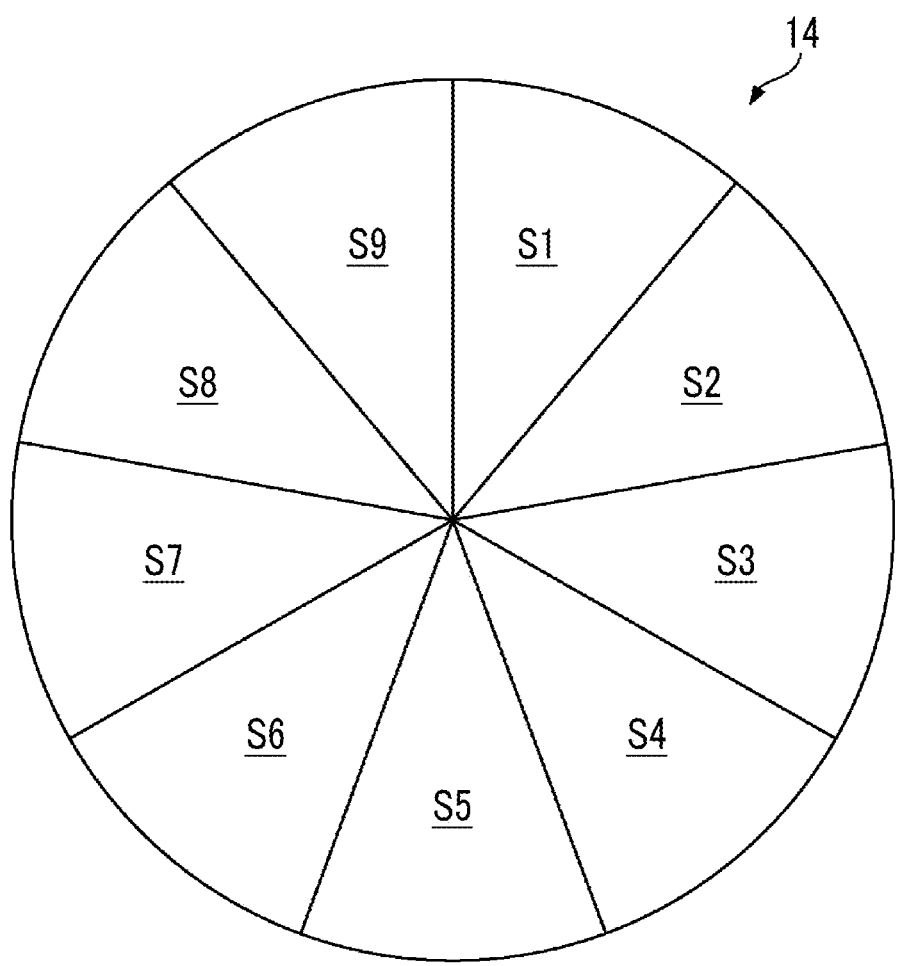
FIG. 3 is a front view of a pupil division filter.

FIG. 3 is a front view of the pupil division filter.

As illustrated in FIG. 3, the pupil division filter 14 has nine optical regions Sj (j=1, 2, 3, 4, 5, 6, 7, 8, and 9) equally divided into nine parts in a circumferential direction. Hereinafter, the nine optical regions Sj will be distinguished as necessary, such that an optical region of a reference numeral S1 is referred to as a first optical region S1, an optical region of a reference numeral S2 is referred to as a second optical region S2, an optical region of a reference numeral S3 is referred to as a third optical region S3, an optical region of a reference numeral S4 is referred to as a fourth optical region S4, an optical region of a reference numeral S5 is referred to as a fifth optical region S5, an optical region of a reference numeral S6 is referred to as a sixth optical region S6, an optical region of a reference numeral S7 is referred to as a seventh optical region S7, an optical region of a reference numeral S8 is referred to as an eighth optical region S8, and an optical region of a reference numeral S9 is referred to as a ninth optical region S9.

Each optical regions Sj is set to allow transmission of light of different wavelength ranges. In addition, among the nine optical regions Sj, an optical region group configured with the first optical region S1, the second optical region S2, and the third optical region S3, an optical region group configured with the fourth optical region S4, the fifth optical region S5, and the sixth optical region S6, and an optical region group configured with the seventh optical region S7, the eighth optical region S8, and the ninth optical region S9 are set to allow transmission of light in polarization directions (transmitted polarization azimuths) different from each other. Such a configuration is implemented by a combination of the narrowband filter 16 and the polarization filter 18 having the following configuration.

Figure 4:
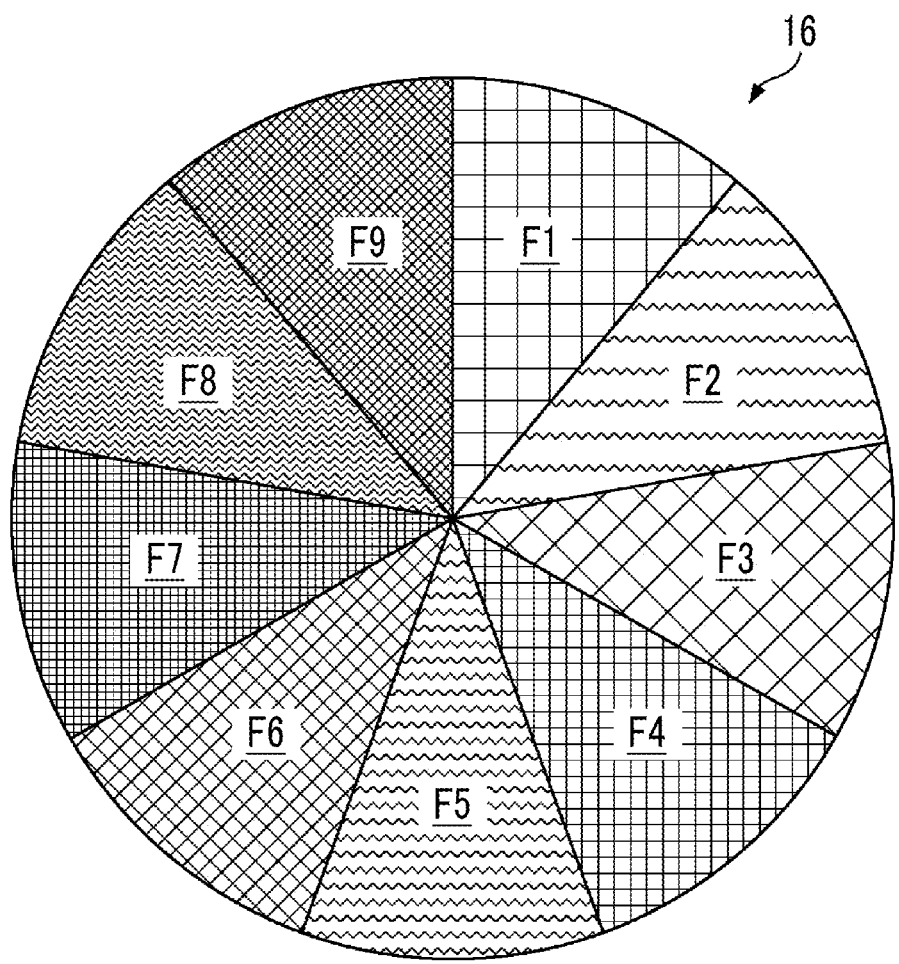
FIG. 4 is a front view of a narrowband filter.

FIG. 4 is a front view of the narrowband filter.

The narrowband filter 16 includes nine narrowband filter units F1 to F9 equally divided into nine parts in the circumferential direction. Hereinafter, the nine narrowband filter units F1 to F9 will be distinguished as necessary, such that a narrowband filter unit of a reference numeral F1 is referred to as a first narrowband filter unit F1, a narrowband filter unit of a reference numeral F2 is referred to as a second narrowband filter unit F2, a narrowband filter unit of a reference numeral F3 is referred to as a third narrowband filter unit F3, a narrowband filter unit of a reference numeral F4 is referred to as a fourth narrowband filter unit F4, a narrowband filter unit of a reference numeral F5 is referred to as a fifth narrowband filter unit F5, a narrowband filter unit of a reference numeral F6 is referred to as a sixth narrowband filter unit F6, a narrowband filter unit of a reference numeral F7 is referred to as a seventh narrowband filter unit F7, a narrowband filter unit of a reference numeral F8 is referred to as an eighth narrowband filter unit F8, and a narrowband filter unit of a reference numeral F9 is referred to as a ninth narrowband filter unit F9.

The narrowband filter units F1 to F9 correspond to the optical regions S1 to S9 of the pupil division filter 14, respectively. That is, the first narrowband filter unit F1 corresponds to the first optical region S1. The second narrowband filter unit F2 corresponds to the second optical region S2. The third narrowband filter unit F3 corresponds to the third optical region S3. The fourth narrowband filter unit F4 corresponds to the fourth optical region S4. The fifth narrowband filter unit F5 corresponds to the fifth optical region S5. The sixth narrowband filter unit F6 corresponds to the sixth optical region S6. The seventh narrowband filter unit F7 corresponds to the seventh optical region S7. The eighth narrowband filter unit F8 corresponds to the eighth optical region S8. The ninth narrowband filter unit F9 corresponds to the ninth optical region S9.

Each of the narrowband filter units F1 to F9 is configured with a bandpass filter that allows transmission of light of different narrowbands.

Figure 5:
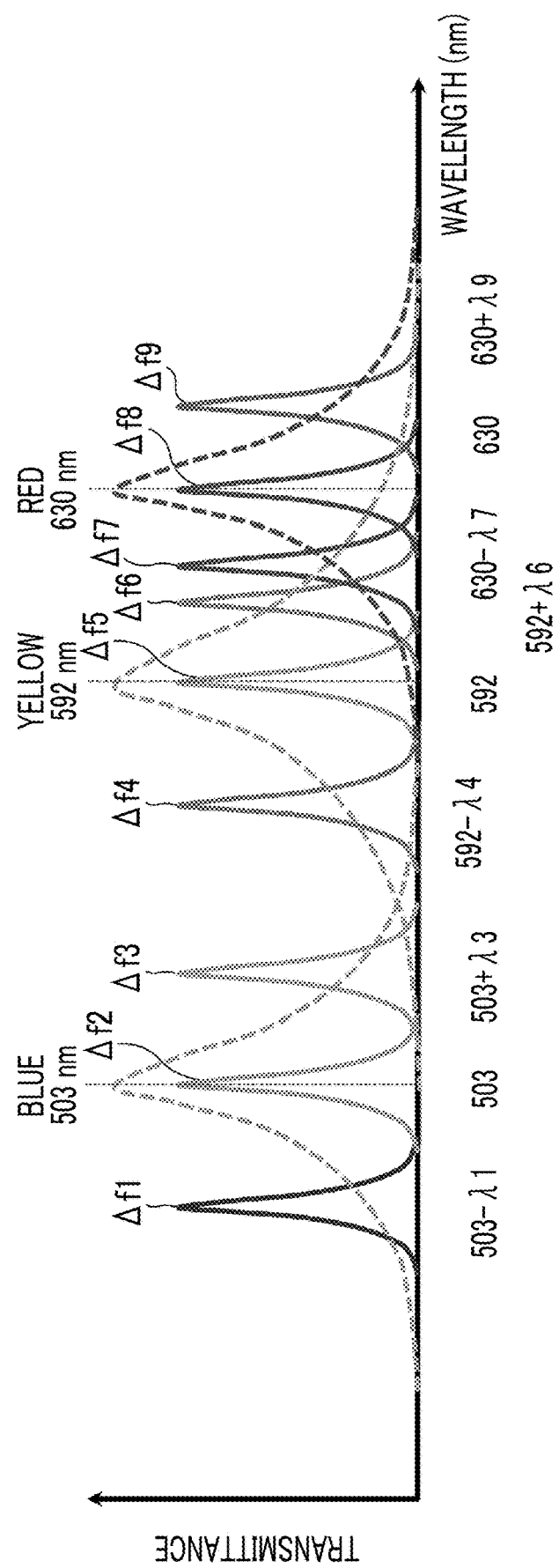
FIG. 5 is a diagram illustrating an example of a transmission wavelength set in a narrowband filter unit.

FIG. 5 is a diagram illustrating an example of a transmission wavelength set in each narrowband filter unit.

A wavelength range of light transmitted through the first narrowband filter unit F1 is referred to as a first wavelength range $\Delta f1$. A wavelength range of light transmitted through the second narrowband filter unit F2 is referred to as a second wavelength range $\Delta f2$. A wavelength range of light transmitted through the third narrowband filter unit F3 is referred to as a third wavelength range $\Delta f3$. A wavelength range of light transmitted through the fourth narrowband filter unit F4 is referred to as a fourth wavelength range $\Delta f4$. A wavelength range of light transmitted through the fifth narrowband filter unit F5 is referred to as a fifth wavelength range $\Delta f5$. A wavelength range of light transmitted through the sixth narrowband filter unit F6 is referred to as a sixth wavelength range $\Delta f6$. A wavelength range of light transmitted through the seventh narrowband filter unit F7 is referred to as a seventh wavelength range $\Delta f7$. A wavelength range of light transmitted through the eighth narrowband filter unit F8 is referred to as an eighth wavelength range Δf8. A wavelength range of light transmitted through the ninth narrowband filter unit F9 is referred to as a ninth wavelength range Δf9.

The second wavelength range Δf2 is a wavelength range corresponding to a wavelength range of the blue LED. It is preferable that a central wavelength of the second wavelength range Δf2 matches a central wavelength (503 nm) of the blue LED, and that a bandwidth of the second wavelength range Δf2 is within the bandwidth of the wavelength range of the blue LED. The central wavelength of the second wavelength range Δf2 is not limited to a case of complete matching with the central wavelength (503 nm) of the blue LED and includes a case of approximate matching. At least a range of less than a half-width of a light emission spectrum of the blue LED from the central wavelength of the blue LED may be used.

A central wavelength of the first wavelength range Δf1 is 503 nm-λ1 and is shorter than the central wavelength (central wavelength (503 nm) of the blue LED) of the second wavelength range Δf2 by λ1. A central wavelength of the third wavelength range Δf3 is 503 nm+λ3 and is longer than the central wavelength of the second wavelength range Δf2 by λ3. That is, unlike the first wavelength range Δf1 and the second wavelength range Δf2, the third wavelength range Δf3 is a wavelength range on an opposite side to the first wavelength range Δf1 with the second wavelength range Δf2 interposed therebetween.

In addition, it is preferable that each of λ1 and λ3 is a value separated by more than or equal to the half-width of the light emission spectrum of the blue LED from the central wavelength of the second wavelength range Δf2.

The fifth wavelength range Δf5 is a wavelength range corresponding to a wavelength range of the yellow LED. It is preferable that a central wavelength of the fifth wavelength range Δf5 matches a central wavelength (592 nm) of the yellow LED, and that a bandwidth of the fifth wavelength range Δf5 is within the bandwidth of the wavelength range of the yellow LED.

The fourth wavelength range Δf4 and the sixth wavelength range Δf6 are respectively preceding and succeeding wavelength ranges of the fifth wavelength range Δf5 interposed therebetween. A central wavelength of the fourth wavelength range Δf4 is 592 nm-λ4, and a central wavelength of the sixth wavelength range Δf6 is 592 nm+λ6. It is preferable that each of λ4 and λ6 is a value separated by more than or equal to a half-width of a light emission spectrum of the yellow LED from the central wavelength of the fifth wavelength range Δf5.

The eighth wavelength range Δf8 is a wavelength range corresponding to a wavelength range of the red LED. It is preferable that a central wavelength of the eighth wavelength range Δf8 matches a central wavelength (630 nm) of the red LED, and that a bandwidth of the eighth wavelength range Δf8 is within the bandwidth of the wavelength range of the red LED.

The seventh wavelength range Δf7 and the ninth wavelength range Δf9 are respectively preceding and succeeding wavelength ranges of the eighth wavelength range Δf8 interposed therebetween. A central wavelength of the seventh wavelength range Δf7 is 630 nm-λ7, and a central wavelength of the ninth wavelength range Δf9 is 630 nm+λ9. It is preferable that each of λ7 and λ9 is a value separated by more than or equal to a half-width of a light emission spectrum of the red LED from the central wavelength of the eighth wavelength range Δf8.

Figure 6:
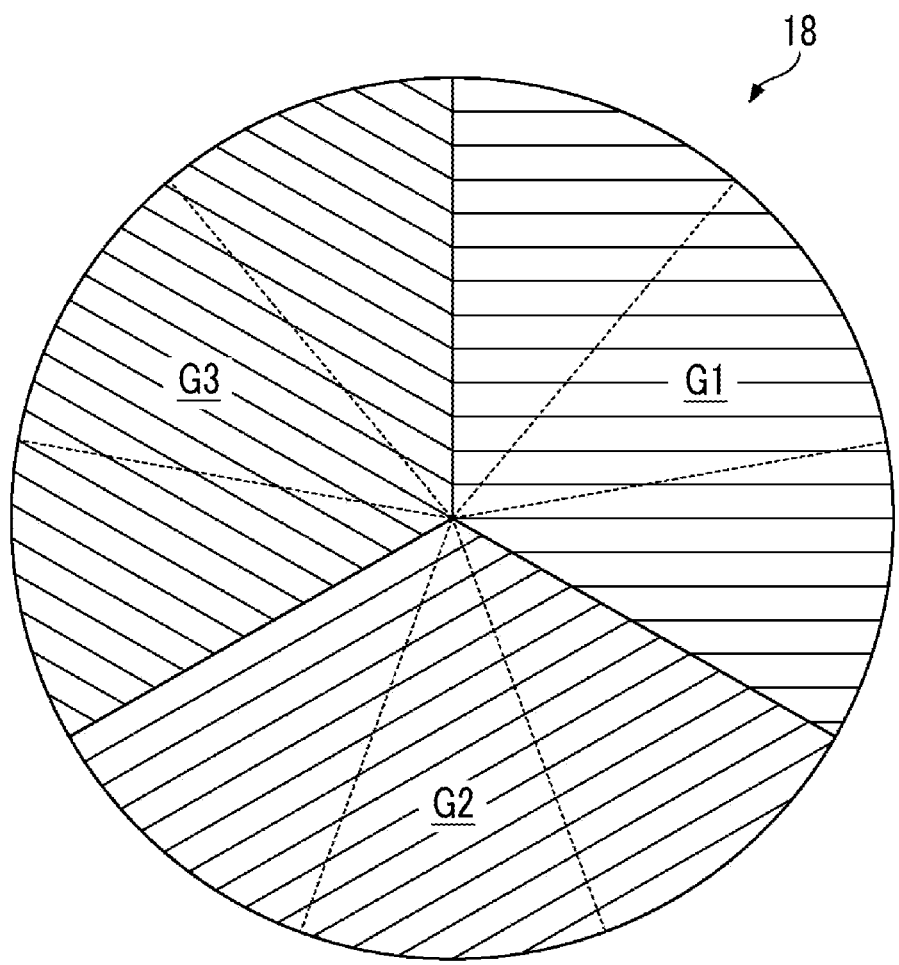
FIG. 6 is a front view of a polarization filter.

FIG. 6 is a front view of the polarization filter.

The polarization filter 18 includes three polarization filter units G1 to G3 equally divided into three parts in the circumferential direction. Hereinafter, the three polarization filter units G1 to G3 will be distinguished as necessary, such that a polarization filter unit of a reference numeral G1 is referred to as a first polarization filter unit G1, a polarization filter unit of a reference numeral G2 is referred to as a second polarization filter unit G2, and a polarization filter unit of a reference numeral G3 is referred to as a third polarization filter unit G3. The first polarization filter unit G1 corresponds to the first optical region S1 to the third optical region S3 of the pupil division filter 14. The second polarization filter unit G2 corresponds to the fourth optical region S4 to the sixth optical region S6 of the pupil division filter 14. The third polarization filter unit G3 corresponds to the seventh optical region S7 to the ninth optical region S9 of the pupil division filter 14.

Figure 7:
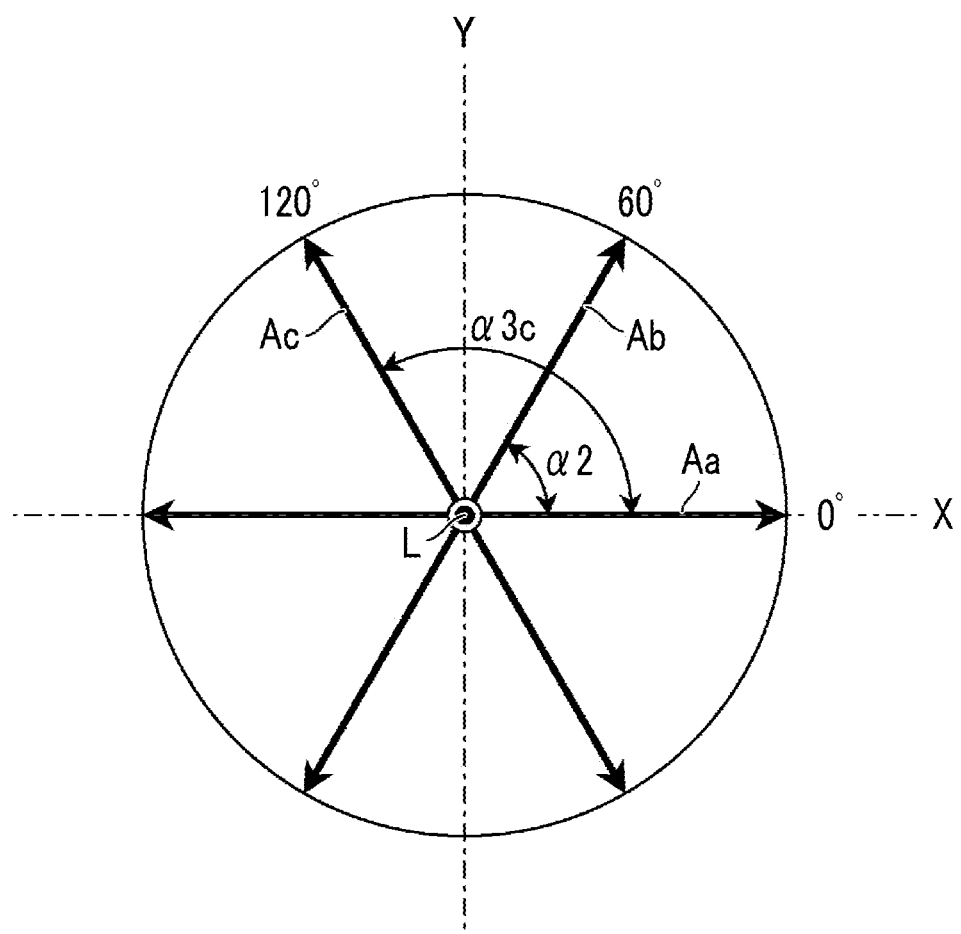
FIG. 7 is a diagram illustrating an example of a polarization direction set in each polarization filter unit of the polarization filter.

FIG. 7 is a diagram illustrating an example of a polarization direction set in each polarization filter unit of the polarization filter.

The polarization direction (transmitted polarization azimuth) is represented by an angle (azimuthal angle) formed between a polarization transmission axis and an X axis in an XY plane orthogonal to an optical axis L. In FIG. 7, a reference numeral Aa denotes a polarization transmission axis of the first polarization filter unit G1. A reference numeral Ab denotes a polarization transmission axis of the second polarization filter unit G2. A reference numeral Ac denotes a polarization transmission axis of the third polarization filter unit G3.

As illustrated in FIG. 7, each of the polarization filter units G1 to G3 has a configuration that allows transmission of light in different polarization directions (transmitted polarization azimuths). A polarization direction (transmitted polarization azimuth) of light transmitted through the first polarization filter unit G1 is denoted by α1. A polarization direction (transmitted polarization azimuth) of light transmitted through the second polarization filter unit G2 is denoted by α2. A polarization direction (transmitted polarization azimuth) of light transmitted through the third polarization filter unit G3 is denoted by α3. In the multi spectral camera 10 of the present embodiment, the first polarization filter unit G1 is set to allow transmission of light having an azimuthal angle of 0° (α1=0°). The second polarization filter unit G2 is set to allow transmission of light having an azimuthal angle of 60° (α2=60°). The third polarization filter unit G3 is set to allow transmission of light having an azimuthal angle of 120° (α3=120°).

The pupil division filter 14 is configured by coaxially superimposing the narrowband filter 16 and the polarization filter 18 having the above configurations. The pupil division filter 14 acts as follows.

Light that passes through the first optical region S1 of the pupil division filter 14 passes through the first narrowband filter unit F1 of the narrowband filter 16 and the first polarization filter unit G1 of the polarization filter 18. Thus, light of the first wavelength range Δf1 is subjected to polarization (linear polarization) in the polarization direction α1 and exits from the first optical region S1. Light that passes through the second optical region S2 of the pupil division filter 14 passes through the second narrowband filter unit F2 of the narrowband filter 16 and the first polarization filter unit G1 of the polarization filter 18. Thus, light of the second wavelength range Δf2 is subjected to polarization (linear polarization) in the polarization direction α1 and exits from the second optical region S2. Light that passes through the third optical region S3 of the pupil division filter 14 passes through the third narrowband filter unit F3 of the narrowband filter 16 and the first polarization filter unit G1 of the polarization filter 18. Thus, light of the third wavelength range Δf3 is subjected to polarization (linear polarization) in the polarization direction α1 and exits from the third optical region S3.

In addition, light that passes through the fourth optical region S4 of the pupil division filter 14 passes through the fourth narrowband filter unit F4 of the narrowband filter 16 and the second polarization filter unit G2 of the polarization filter 18. Thus, light of the fourth wavelength range Δf4 is subjected to polarization (linear polarization) in the polarization direction α2 and exits from the fourth optical region S4. Light that passes through the fifth optical region S5 of the pupil division filter 14 passes through the fifth narrowband filter unit F5 of the narrowband filter 16 and the second polarization filter unit G2 of the polarization filter 18. Thus, light of the fifth wavelength range Δf5 is subjected to polarization (linear polarization) in the polarization direction α2 and exits from the fifth optical region S5. Light that passes through the sixth optical region S6 of the pupil division filter 14 passes through the sixth narrowband filter unit F6 of the narrowband filter 16 and the second polarization filter unit G2 of the polarization filter 18. Thus, light of the sixth wavelength range Δf6 is subjected to polarization (linear polarization) in the polarization direction α2 and exits from the sixth optical region S6.

In addition, light that passes through the seventh optical region S7 of the pupil division filter 14 passes through the seventh narrowband filter unit F7 of the narrowband filter 16 and the third polarization filter unit G3 of the polarization filter 18. Thus, light of the seventh wavelength range Δf7 is subjected to polarization (linear polarization) in the polarization direction α3 and exits from the seventh optical region S7. Light that passes through the eighth optical region S8 of the pupil division filter 14 passes through the eighth narrowband filter unit F8 of the narrowband filter 16 and the third polarization filter unit G3 of the polarization filter 18. Thus, light of the eighth wavelength range Δf8 is subjected to polarization (linear polarization) in the polarization direction α3 and exits from the eighth optical region S8. Light that passes through the ninth optical region S9 of the pupil division filter 14 passes through the ninth narrowband filter unit F9 of the narrowband filter 16 and the third polarization filter unit G3 of the polarization filter 18. Thus, light of the ninth wavelength range Δf9 is subjected to polarization (linear polarization) in the polarization direction α3 and exits from the ninth optical region S9.

The entire imaging optical system 11 is disposed to be movable forward and rearward along the optical axis L. Accordingly, focal point adjustment is performed.

Image Sensor

Figure 8:
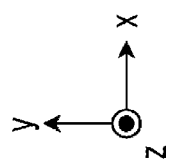
FIG. 8 is a diagram illustrating a schematic configuration of arrangement of pixels of an image sensor.

FIG. 8 is a diagram illustrating a schematic configuration of arrangement of pixels of the image sensor.

As illustrated in FIG. 8, the image sensor 20 includes a plurality of pixels Pi (i=1, 2, 3, 4, 5, 6, 7, 8, and 9) on the light-receiving surface. The pixels Pi are regularly arranged at constant pitches in a horizontal direction (x direction) and a vertical direction (y direction).

In the image sensor 20 of the present embodiment, one pixel block PB(x, y) is configured with nine (three×three) adjacent pixels Pi, and this pixel block PB(x, y) are regularly arranged in the horizontal direction (x direction) and the vertical direction (y direction). Hereinafter, the nine pixels comprised in one pixel block PB(x, y) will be distinguished as necessary, such that a pixel of a reference numeral P1 is referred to as a first pixel P1, a pixel of a reference numeral P2 is referred to as a second pixel P2, a pixel of a reference numeral P3 is referred to as a third pixel P3, a pixel of a reference numeral P4 is referred to as a fourth pixel P4, a pixel of a reference numeral P5 is referred to as a fifth pixel P5, a pixel of a reference numeral P6 is referred to as a sixth pixel P6, a pixel of a reference numeral P7 is referred to as a seventh pixel P7, a pixel of a reference numeral P8 is referred to as an eighth pixel P8, and a pixel of a reference numeral P9 is referred to as a ninth pixel P9. Each pixel Pi receives light having different characteristics.

Figure 9:
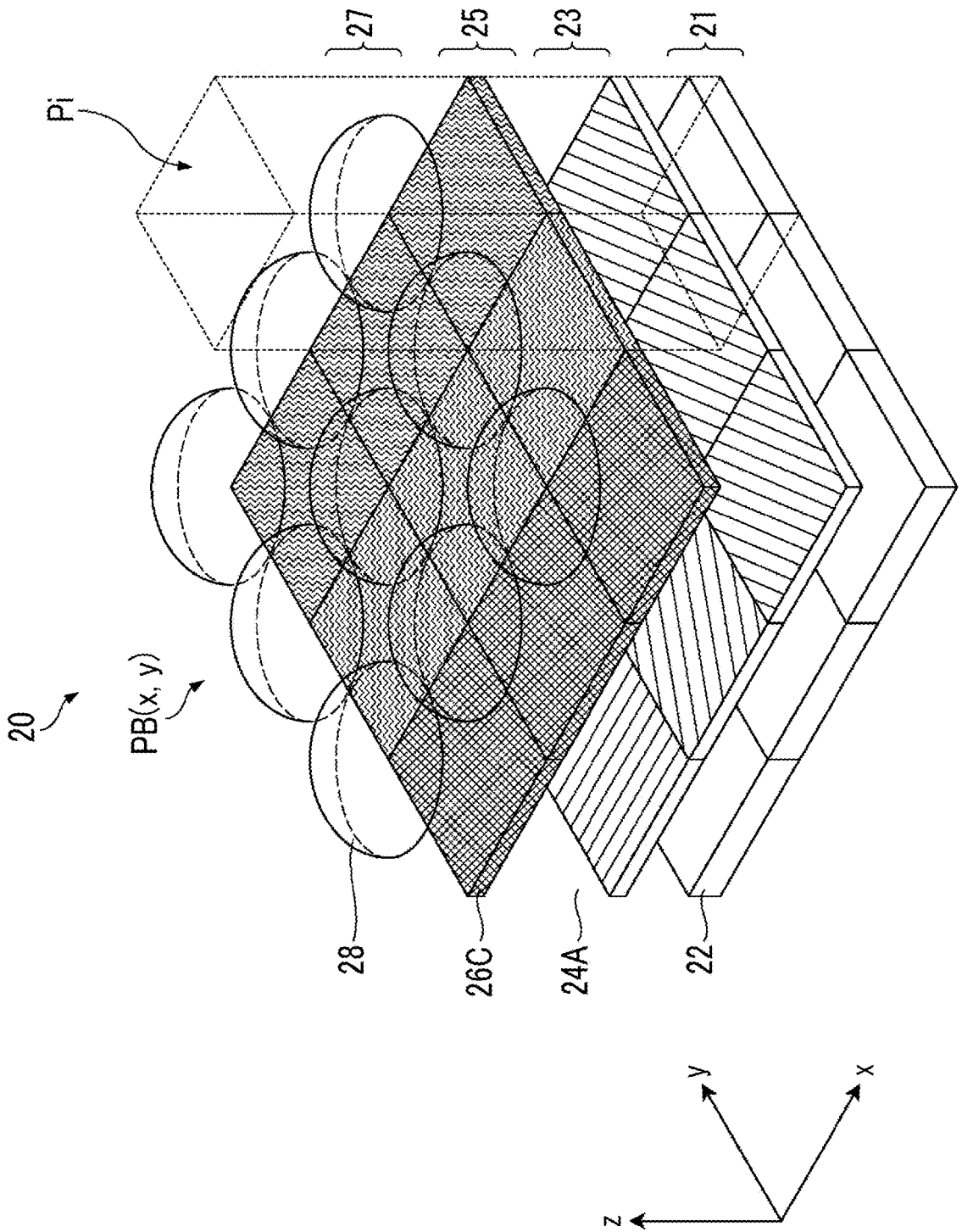
FIG. 9 is a diagram illustrating a schematic configuration of the image sensor.
Figure 10:
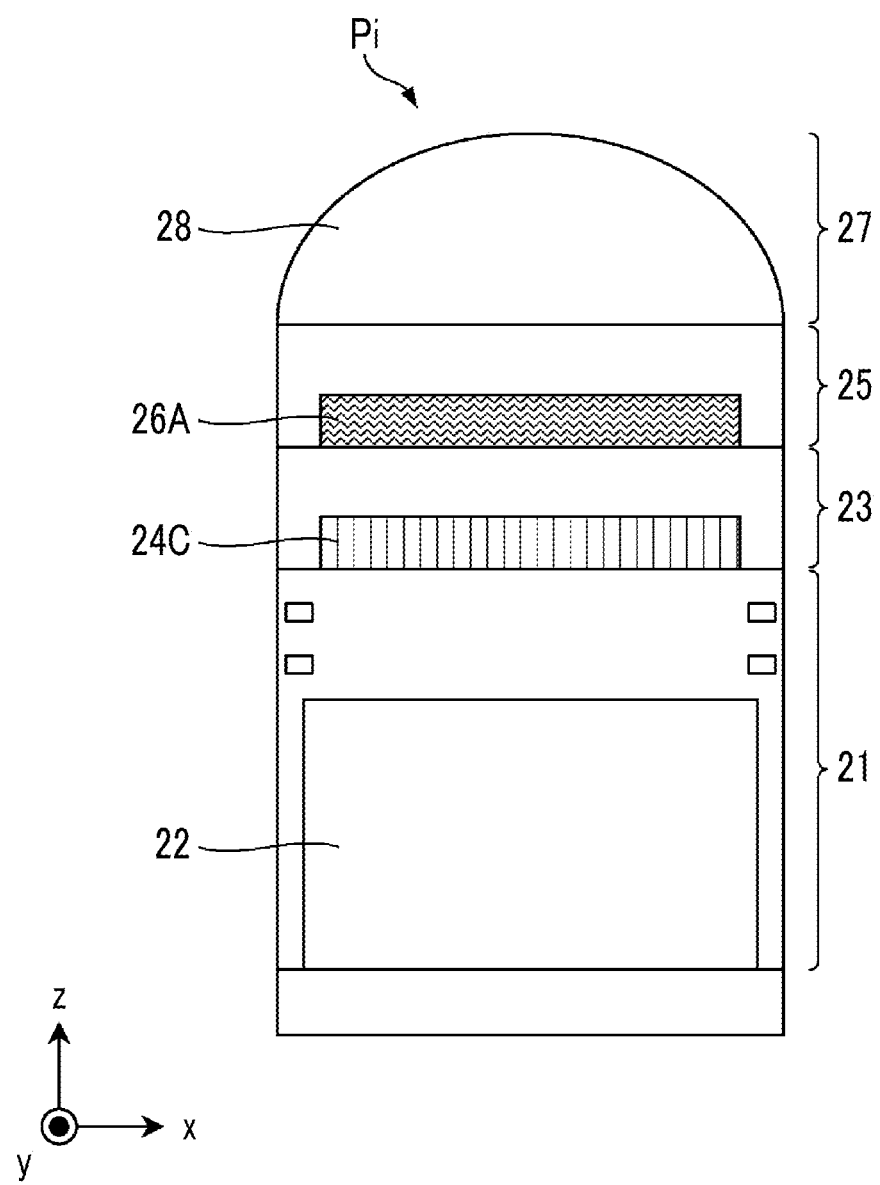
FIG. 10 is a cross-sectional view illustrating a schematic configuration of a pixel illustrated by a broken line portion in FIG. 9.

FIG. 9 is a diagram illustrating a schematic configuration of the image sensor. FIG. 10 is a cross-sectional view illustrating a schematic configuration of one pixel (broken line portion in FIG. 9).

The image sensor 20 has a pixel array layer 21, a polarization filter element array layer 23, a spectroscopic filter element array layer 25, and a microlens array layer 27. Each layer is arranged in an order of the pixel array layer 21, the polarization filter element array layer 23, the spectroscopic filter element array layer 25, and the microlens array layer 27 from an image plane side to an object side.

The pixel array layer 21 is configured by two-dimensionally arranging multiple photodiodes 22. One photodiode 22 constitutes one pixel. Each photodiode 22 is regularly arranged in the horizontal direction (x direction) and the vertical direction (y direction).

The polarization filter element array layer 23 is configured by two-dimensionally arranging three types of polarization filter elements 24A, 24B, and 24C having polarization directions (transmitted polarization azimuths) different from each other. Hereinafter, the three types of polarization filter elements 24A, 24B, and 24C will be distinguished as necessary, such that a polarization filter element of a reference numeral 24A is referred to as a first polarization filter element 24A, a polarization filter element of a reference numeral 24B is referred to as a second polarization filter element 24B, and a polarization filter element of a reference numeral 24C is referred to as a third polarization filter element 24C.

Each of the polarization filter elements 24A, 24B, and 24C is arranged at the same intervals as the pixel array layer 21 and is comprised for each pixel. A polarization direction (transmitted polarization azimuth) of light transmitted through the first polarization filter element 24A is denoted by β1. A polarization direction (transmitted polarization azimuth) of light transmitted through the second polarization filter element 24B is denoted by β2. A polarization direction (transmitted polarization azimuth) of light transmitted through the third polarization filter element 24C is denoted by β3.

In the multispectral camera 10, the first polarization filter element 24A is set to allow transmission of light having an azimuthal angle of 0° (β1=0°). The second polarization filter element 24B is set to allow transmission of light having an azimuthal angle of 60° ((32=) 60°. The third polarization filter element 24C is set to allow transmission of light having an azimuthal angle of 120° (β3=120°). The polarization filter elements 24A, 24B, and 24C are an example of a second optical filter.

In each pixel block PB(x, y), the polarization filter elements 24A, 24B, and 24C are regularly arranged.

Figure 11:
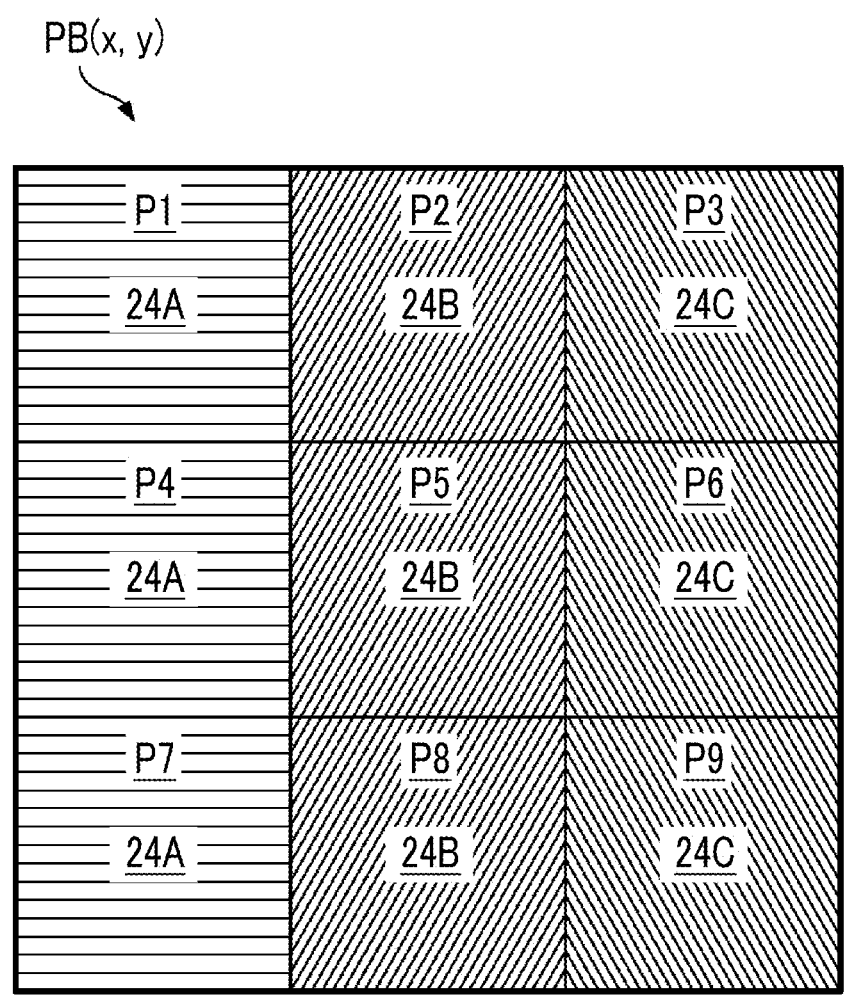
FIG. 11 is a diagram illustrating an example of an arrangement pattern of polarization filter elements comprised in each pixel block.

FIG. 11 is a diagram illustrating an example of an arrangement pattern of the polarization filter elements comprised in each pixel block.

As illustrated in FIG. 11, in the multispectral camera 10 of the present embodiment, the first polarization filter element 24A is comprised in the first pixel P1, the fourth pixel P4, and the seventh pixel P7 that are pixels of a first column in the pixel block. The second polarization filter element 24B is comprised in the second pixel P2, the fifth pixel P5, and the eighth pixel P8 that are pixels of a second column in the pixel block. The third polarization filter element 24C is comprised in the third pixel P3, the sixth pixel P6, and the ninth pixel P9 that are pixels of a third column in the pixel block.

The spectroscopic filter element array layer 25 is configured by two-dimensionally arranging three types of spectroscopic filter elements 26A, 26B, and 26C having spectroscopic transmittances different from each other. Hereinafter, the three types of spectroscopic filter elements 26A, 26B, and 26C will be distinguished as necessary, such that a spectroscopic filter element of a reference numeral 26A is referred to as a first spectroscopic filter element 26A, a spectroscopic filter element of a reference numeral 26B is referred to as a second spectroscopic filter element 26B, and a spectroscopic filter element of a reference numeral 26C is referred to as a third spectroscopic filter element 26C. Each of the spectroscopic filter elements 26A, 26B, and 26C is arranged at the same intervals as the photodiodes 22 and is comprised for each pixel.

The spectroscopic filter elements 26A, 26B, and 26C allow transmission of light transmitted through each of the narrowband filter units F1 to F9 of the narrowband filter 16 with different transmittances. In the multispectral camera 10, the first spectroscopic filter element 26A has characteristics of allowing transmission of more light of a short wavelength range in a wavelength range of visible light. The second spectroscopic filter element 26B has characteristics of allowing transmission of more light of a middle wavelength range. The third spectroscopic filter element 26C has characteristics of allowing transmission of more light of a long wavelength range. For example, the spectroscopic filter elements 26A, 26B, and 26C may be color filters of B, G, and R disposed in a general color image sensor.

Figure 12:
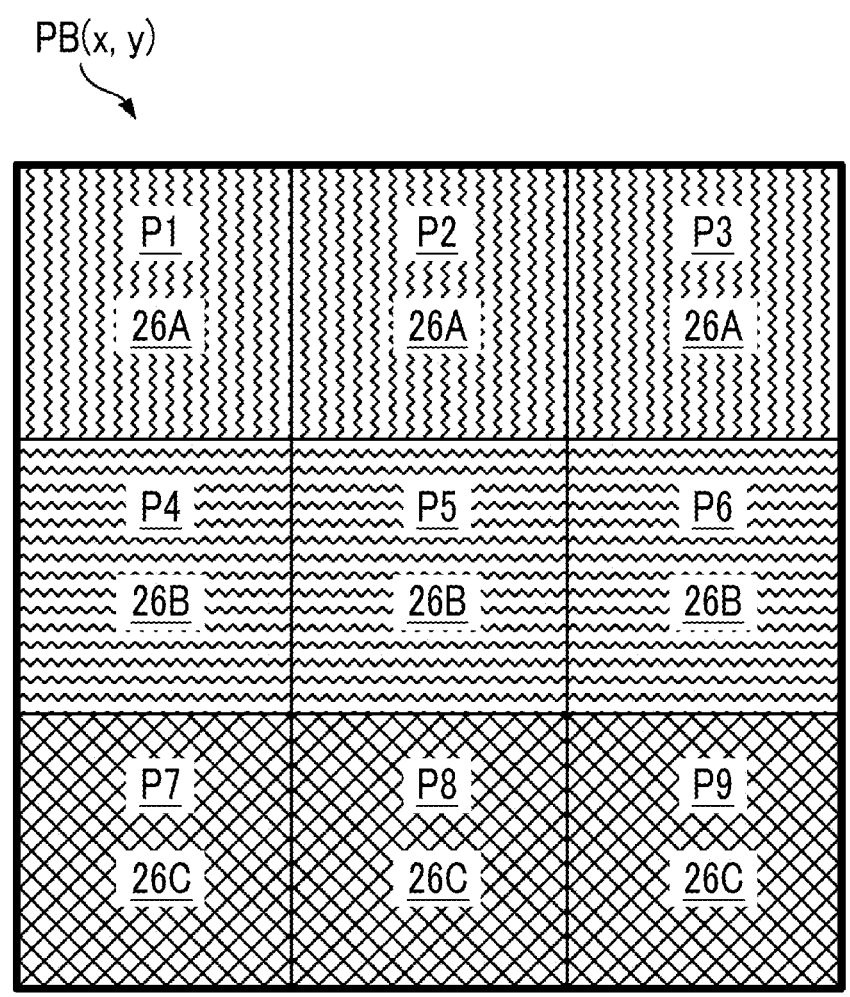
FIG. 12 is a diagram illustrating an example of an arrangement pattern of spectroscopic filter elements comprised in each pixel block.

FIG. 12 is a diagram illustrating an example of an arrangement pattern of the spectroscopic filter elements comprised in each pixel block.

As illustrated in FIG. 12, in each pixel block PB(x, y), the spectroscopic filter elements 26A, 26B, and 26C are regularly arranged. In the multispectral camera 10 of the present example, the first spectroscopic filter element 26A is comprised in the first pixel P1, the second pixel P2, and the third pixel P3 that are pixels of a first row in the pixel block. The second spectroscopic filter element 26B is comprised in the fourth pixel P4, the fifth pixel P5, and the sixth pixel P6 that are pixels of a second row in the pixel block. The third spectroscopic filter element 26C is comprised in the seventh pixel P7, the eighth pixel P8, and the ninth pixel P9 that are pixels of a third row in the pixel block.

As illustrated in FIG. 9, the microlens array layer 27 is configured by two-dimensionally arranging multiple microlenses 28. Each microlens 28 is arranged at the same intervals as the photodiodes 22 and is comprised for each pixel. The microlenses 28 are comprised for a purpose of efficiently condensing light from the imaging optical system 11 on the photodiodes 22.

In each pixel block PB(x, y) of the image sensor 20 configured above, each pixel Pi receives light from the imaging optical system 11 as follows.

The first pixel P1 receives light from the imaging optical system 11 through the first spectroscopic filter element 26A and the first polarization filter element 24A. The second pixel P2 receives light from the imaging optical system 11 through the first spectroscopic filter element 26A and the second polarization filter element 24B. The third pixel P3 receives light from the imaging optical system 11 through the first spectroscopic filter element 26A and the third polarization filter element 24C.

In addition, the fourth pixel P4 receives light from the imaging optical system 11 through the second spectroscopic filter element 26B and the first polarization filter element 24A. The fifth pixel P5 receives light from the imaging optical system 11 through the second spectroscopic filter element 26B and the second polarization filter element 24B. In addition, the sixth pixel P6 receives light from the imaging optical system 11 through the second spectroscopic filter element 26B and the third polarization filter element 24C.

In addition, the seventh pixel P7 receives light from the imaging optical system 11 through the third spectroscopic filter element 26C and the first polarization filter element 24A. The eighth pixel P8 receives light from the imaging optical system 11 through the third spectroscopic filter element 26C and the second polarization filter element 24B. The ninth pixel P9 receives light from the imaging optical system 11 through the third spectroscopic filter element 26C and the third polarization filter element 24C.

In such a manner, by including different combinations of the spectroscopic filter elements 26A, 26B, and 26C and the polarization filter elements 24A, 24B, and 24C, each pixel Pi of the pixel block PB(x, y) receives light having different characteristics.

Signal Processing Unit

Figure 13:
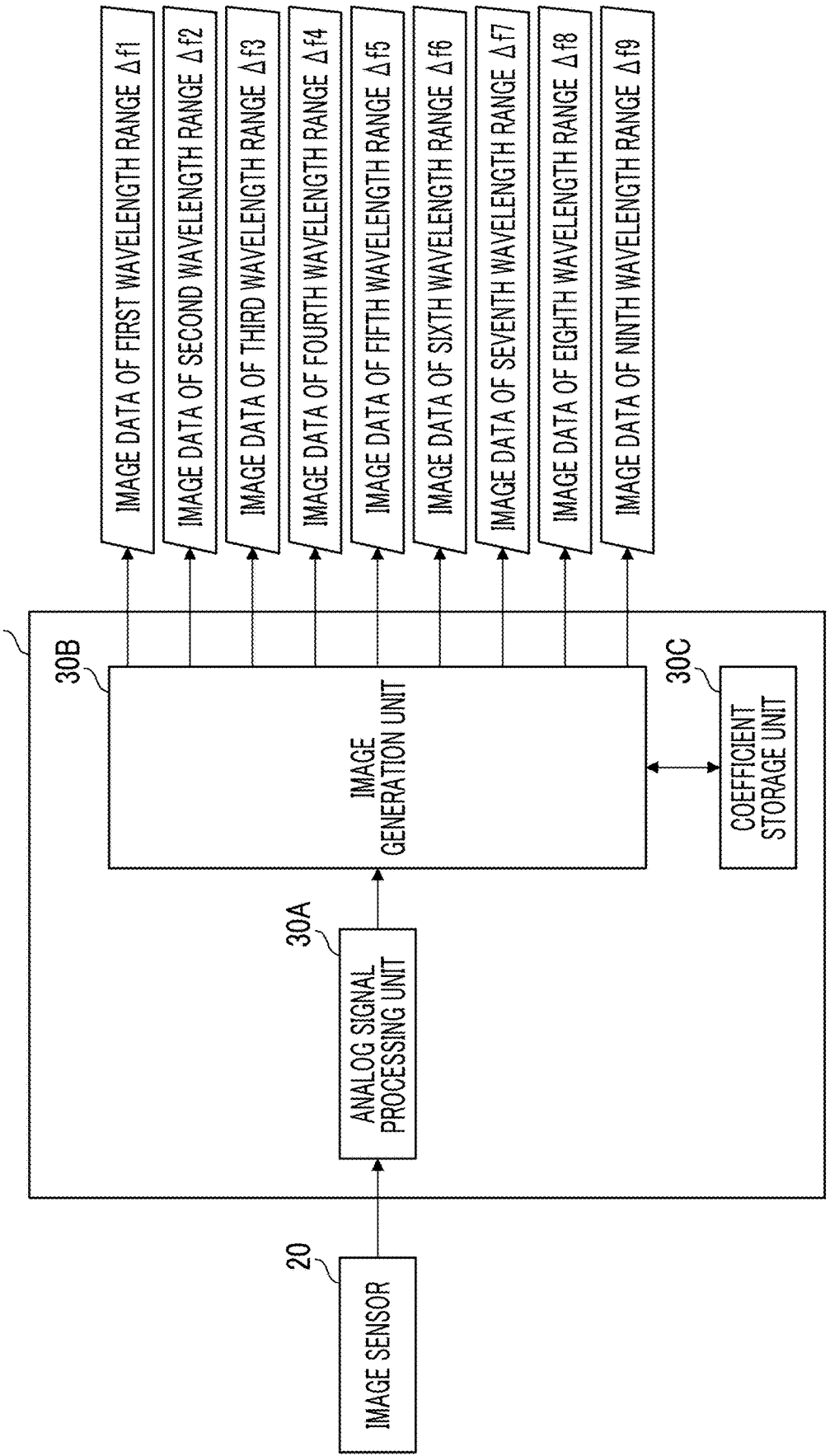
FIG. 13 is a main block diagram of a signal processing unit of the multispectral camera.

FIG. 13 is a main block diagram of the signal processing unit of the multispectral camera.

As illustrated in FIG. 13, the signal processing unit 30 is a part that generates image data acquired by each optical region Sj of the imaging optical system 11 by processing an image signal output from the image sensor 20, and comprises an analog signal processing unit 30A, an image generation unit 30B, and a coefficient storage unit 30C.

The image signal output from the image sensor 20 is provided to the analog signal processing unit 30A. The analog signal processing unit 30A is configured to include a sampling and hold circuit, a color separation circuit, an automatic gain control (AGC) circuit, and the like. The AGC circuit functions as a sensitivity adjustment unit that adjusts sensitivity (International Organization for Standardization (ISO) sensitivity) in imaging, and causes a signal level of the image signal to fall into an appropriate range by adjusting a gain of an amplifier amplifying the input image signal. An A/D converter converts an analog image signal output from the analog signal processing unit into a digital image signal. In a case where the image sensor 20 is a CMOS image sensor, the analog signal processing unit and the A/D converter are generally incorporated in the CMOS image sensor.

As illustrated in FIG. 8, each pixel block PB(x, y) includes the first pixel P1, the second pixel P2, the third pixel P3, the fourth pixel P4, the fifth pixel P5, the sixth pixel P6, the seventh pixel P7, the eighth pixel P8, and the ninth pixel P9.

The image generation unit 30B generates nine pieces of image data D1 to D9 by separating and extracting pixel signals of the first pixel P1, the second pixel P2, the third pixel P3, the fourth pixel P4, the fifth pixel P5, the sixth pixel P6, the seventh pixel P7, the eighth pixel P8, and the ninth pixel P9 from each pixel block PB(x, y).

However, interference (crosstalk) occurs in the nine pieces of image data D1 to D9. That is, since light from each optical region Sj of the imaging optical system 11 is incident on each pixel Pi, a generated image is an image in which an image of each optical region Sj is mixed at a predetermined ratio. Thus, the image generation unit 30B removes the interference (crosstalk) by performing the following operation processing.

Here, a pixel signal (signal value) obtained by the first pixel P1 of each pixel block PB(x, y) is denoted by x1. A pixel signal obtained by the second pixel P2 is denoted by x2. A pixel signal obtained by the third pixel P3 is denoted by x3. A pixel signal obtained by the fourth pixel P4 is denoted by x4. A pixel signal obtained by the fifth pixel P5 is denoted by x5. A pixel signal obtained by the sixth pixel P6 is denoted by x6. A pixel signal obtained by the seventh pixel P7 is denoted by x7. A pixel signal obtained by the eighth pixel P8 is denoted by x8. A pixel signal obtained by the ninth pixel P9 is denoted by x9. The nine pixel signals x1 to x9 are obtained from each pixel block PB(x, y). The image generation unit 30B removes the interference by calculating nine pixel signals X1 to X9 respectively corresponding to the optical regions S1 to S9 from the nine pixel signals x1 to x9 using Expression 2 in which a matrix A illustrated in Expression 1 is used.

$$A = \begin{bmatrix} a11 & a12 & a13 & a14 & a15 & a16 & a17 & a18 & a19 \\ a21 & a22 & a23 & a24 & a25 & a26 & a27 & a28 & a29 \\ a31 & a32 & a33 & a34 & a35 & a36 & a37 & a38 & a39 \\ a41 & a42 & a43 & a44 & a45 & a46 & a47 & a48 & a49 \\ a51 & a52 & a53 & a54 & a51 & a56 & a57 & a58 & a59 \\ a61 & a62 & a63 & a64 & a65 & a66 & a67 & a68 & a69 \\ a71 & a72 & a73 & a74 & a75 & a76 & a77 & a78 & a79 \\ a81 & a82 & a83 & a84 & a85 & a86 & a87 & a88 & a89 \\ a91 & a92 & a93 & a94 & a95 & a96 & a97 & a98 & a99 \end{bmatrix} \quad \text{Expression 1}$$

$$\begin{bmatrix} X1 \\ X2 \\ X3 \\ X4 \\ X5 \\ X6 \\ X7 \\ X8 \\ X9 \end{bmatrix} = \begin{bmatrix} a11 & a12 & a13 & a14 & a15 & a16 & a17 & a18 & a19 \\ a21 & a22 & a23 & a24 & a25 & a26 & a27 & a28 & a29 \\ a31 & a32 & a33 & a34 & a35 & a36 & a37 & a38 & a39 \\ a41 & a42 & a43 & a44 & a45 & a46 & a47 & a48 & a49 \\ a51 & a52 & a53 & a54 & a51 & a56 & a57 & a58 & a59 \\ a61 & a62 & a63 & a64 & a65 & a66 & a67 & a68 & a69 \\ a71 & a72 & a73 & a74 & a75 & a76 & a77 & a78 & a79 \\ a81 & a82 & a83 & a84 & a85 & a86 & a87 & a88 & a89 \\ a91 & a92 & a93 & a94 & a95 & a96 & a97 & a98 & a99 \end{bmatrix} * \begin{bmatrix} x1 \\ x2 \\ x3 \\ x4 \\ x5 \\ x6 \\ x7 \\ x8 \\ x9 \end{bmatrix} \quad \text{Expression 2}$$

The pixel signal X1 is a pixel signal corresponding to the first optical region S1. The pixel signal X2 is a pixel signal corresponding to the second optical region S2. The pixel signal X3 is a pixel signal corresponding to the third optical region S3. The pixel signal X4 is a pixel signal corresponding to the fourth optical region S4. The pixel signal X5 is a pixel signal corresponding to the fifth optical region S5. The pixel signal X6 is a pixel signal corresponding to the sixth optical region S6. The pixel signal X7 is a pixel signal corresponding to the seventh optical region S7. The pixel signal X8 is a pixel signal corresponding to the eighth optical region S8. The pixel signal X9 is a pixel signal corresponding to the ninth optical region S9.

Accordingly, an image acquired by the first optical region S1 is generated from the pixel signal X1. An image acquired by the second optical region S2 is generated from the pixel signal X2. An image acquired by the third optical region S3 is generated from the pixel signal X3. An image acquired by the fourth optical region S4 is generated from the pixel signal X4. An image acquired by the fifth optical region S5 is generated from the pixel signal X5. An image acquired by the sixth optical region S6 is generated from the pixel signal X6. An image acquired by the seventh optical region S7 is generated from the pixel signal X7. An image acquired by the eighth optical region S8 is generated from the pixel signal X8. An image acquired by the ninth optical region S9 is generated from the pixel signal X9.

Hereinafter, a reason why the interference can be removed using Expression 2 will be described.

The interference occurs due to mixing of light from each optical region Sj into each pixel Pi. Here, in a case where a ratio (interference amount (referred to as an interference ratio)) at which light incident on the j-th optical region Sj (j=1 to 9) of the imaging optical system 11 is received by the i-th pixel Pi (i=1 to 9) of each pixel block PB(x, y) is denoted by bij (i=1 to 9 and j=1 to 9), the following relationship is established between the pixel signal xi obtained by each pixel Pi of each pixel block PB(x, y) and the pixel signal Xj corresponding to each optical region Sj of the imaging optical system 11.

That is, the following expression is established with respect to the pixel signal x1 obtained by the first pixel P1 ("*" is a symbol of integrating accumulation).

$$b11*X1+b12*X2+b13*X3+b14*X4+b15*X5+b16*X6+b17*X7+b18*X8+b19*X9=x1 \quad \text{Expression 3}$$

Similarly, an expression similar to Expression 3 is established with respect to the pixel signals x2 to x9 obtained by the second pixel P2 to the ninth pixel P9, respectively.

By solving simultaneous equations consisting of nine expressions for X1 to X9, pixel signals of an original image, that is, the pixel signals X1 to X9 respectively corresponding to the optical regions S1 to S9, can be acquired.

Here, the simultaneous equations can be represented using Expression 5 in which a matrix B of Expression 4 is used.

$$B = \begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & ba48 & b49 \\ b51 & b52 & b53 & b54 & b51 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix} \quad \text{Expression 4}$$

$$\begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & b48 & b49 \\ b51 & b52 & b53 & b54 & b51 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix} * \quad \text{Expression 5}$$

-continued $$\begin{bmatrix} X1 \\ X2 \\ X3 \\ X4 \\ X5 \\ X6 \\ X7 \\ X8 \\ X9 \end{bmatrix} = \begin{bmatrix} x1 \\ x2 \\ x3 \\ x4 \\ x5 \\ x6 \\ x7 \\ x8 \\ x9 \end{bmatrix}$$

X1 to X9 that are solutions of the simultaneous equations consisting of the nine expressions can be calculated using Expression 6 that is obtained by multiplying both sides of Expression 5 by an inverse matrix $B^{-1}$ of the matrix B.

$$\begin{bmatrix} X1 \\ X2 \\ X3 \\ X4 \\ X5 \\ X6 \\ X7 \\ X8 \\ X9 \end{bmatrix} = \begin{bmatrix} b11 & b12 & b13 & b14 & b15 & b16 & b17 & b18 & b19 \\ b21 & b22 & b23 & b24 & b25 & b26 & b27 & b28 & b29 \\ b31 & b32 & b33 & b34 & b35 & b36 & b37 & b38 & b39 \\ b41 & b42 & b43 & b44 & b45 & b46 & b47 & b48 & b49 \\ b51 & b52 & b53 & b54 & b51 & b56 & b57 & b58 & b59 \\ b61 & b62 & b63 & b64 & b65 & b66 & b67 & b68 & b69 \\ b71 & b72 & b73 & b74 & b75 & b76 & b77 & b78 & b79 \\ b81 & b82 & b83 & b84 & b85 & b86 & b87 & b88 & b89 \\ b91 & b92 & b93 & b94 & b95 & b96 & b97 & b98 & b99 \end{bmatrix}^{-1} * \begin{bmatrix} x1 \\ x2 \\ x3 \\ x4 \\ x5 \\ x6 \\ x7 \\ x8 \\ x9 \end{bmatrix}$$

Expression 6

In such a manner, the pixel signals X1 to X9 respectively corresponding to the optical regions S1 to S9 can be calculated from the respective signal values (pixel signals) x1 to x9 of the pixels P1 to P9 based on the ratio at which light incident on the optical regions S1 to S9 of the imaging optical system 11 is received by the pixels P1 to P9 of the pixel block PB(x, y), respectively.

In Expression 2, the inverse matrix $B^{-1}$ of Expression 6 is replaced with the matrix A ($B^{-1}=A$). Accordingly, each element aij of the matrix A in Expression 2 can be acquired by obtaining the inverse matrix $B^{-1}$ of the matrix B. Each element bij (i=1 to 9 and j=1 to 9) of the matrix B is the ratio (interference amount) at which light incident on the j-th optical region Sj (j=1 to 9) of the imaging optical system 11 is received by the i-th pixel Pi (i=1 to 9) of each pixel block PB(x, y). In a case where a transmittance based on polarization is denoted by c, and where a transmittance based on the spectroscopic transmittance is denoted by d, this ratio is calculated as a product of the transmittance c and the transmittance d.

Here, the transmittance c based on polarization is calculated as a square of a cosine of an angular difference between a transmitted polarization azimuth of light transmitted through the optical region and a transmitted polarization azimuth of light received by the pixel.

In addition, the transmittance d based on the spectroscopic transmittance is obtained based on the wavelength range of light transmitted through the optical region and the spectroscopic transmittances of the spectroscopic filter elements comprised in the pixel.

For example, in a relationship between the j-th optical region Sj of the imaging optical system 11 and the i-th pixel Pi of the image sensor 20, in a case where a transmitted polarization azimuth of light transmitted through the j-th optical region Sj is denoted by θj, and a transmitted polarization azimuth of light received by the i-th pixel Pi is denoted by Φi, the transmittance c based on polarization is calculated as a square ($\cos^2 (|θj-Φi|)$)(of a cosine (cos) of an angular difference ($|θj-Φi|$) therebetween.

In addition, the transmittance d based on the spectroscopic transmittance is obtained based on the wavelength range of light transmitted through the j-th optical region Sj and the spectroscopic transmittances of the spectroscopic filter elements 26A, 26B, and 26C comprised in the i-th pixel Pi. That is, the transmittance d is obtained from the wavelength range of light transmitted through the j-th optical region Sj based on the spectroscopic transmittances of the spectroscopic filter elements 26A, 26B, and 26C comprised in the i-th pixel Pi.

The coefficient storage unit 30C illustrated in FIG. 13 stores each element aij of the matrix A of nine rows and nine columns as a coefficient group. The image generation unit 30B acquires the coefficient group from the coefficient storage unit 30C and generates nine pieces of image data of the optical regions S1 to S9, respectively, by calculating the pixel signals X1 to X9 respectively corresponding to the optical regions S1 to S9 of the imaging optical system 11 from the pixel signals x1 to x9 respectively obtained from the pixels P1 to P9 of each pixel block PB(x, y), using Expression 2.

That is, the multispectral camera 10 of the present example can capture, at the same time, nine images of the first wavelength range Δf1 to the ninth wavelength range Δf9 transmitted through the nine narrowband filter units F1 to F9, respectively. Nine pieces of image data indicating the images of the first wavelength range Δf1 to the ninth wavelength range Δf9 captured at the same time by the multispectral camera 10 are output to the processor 100.

Processor

Figure 14:
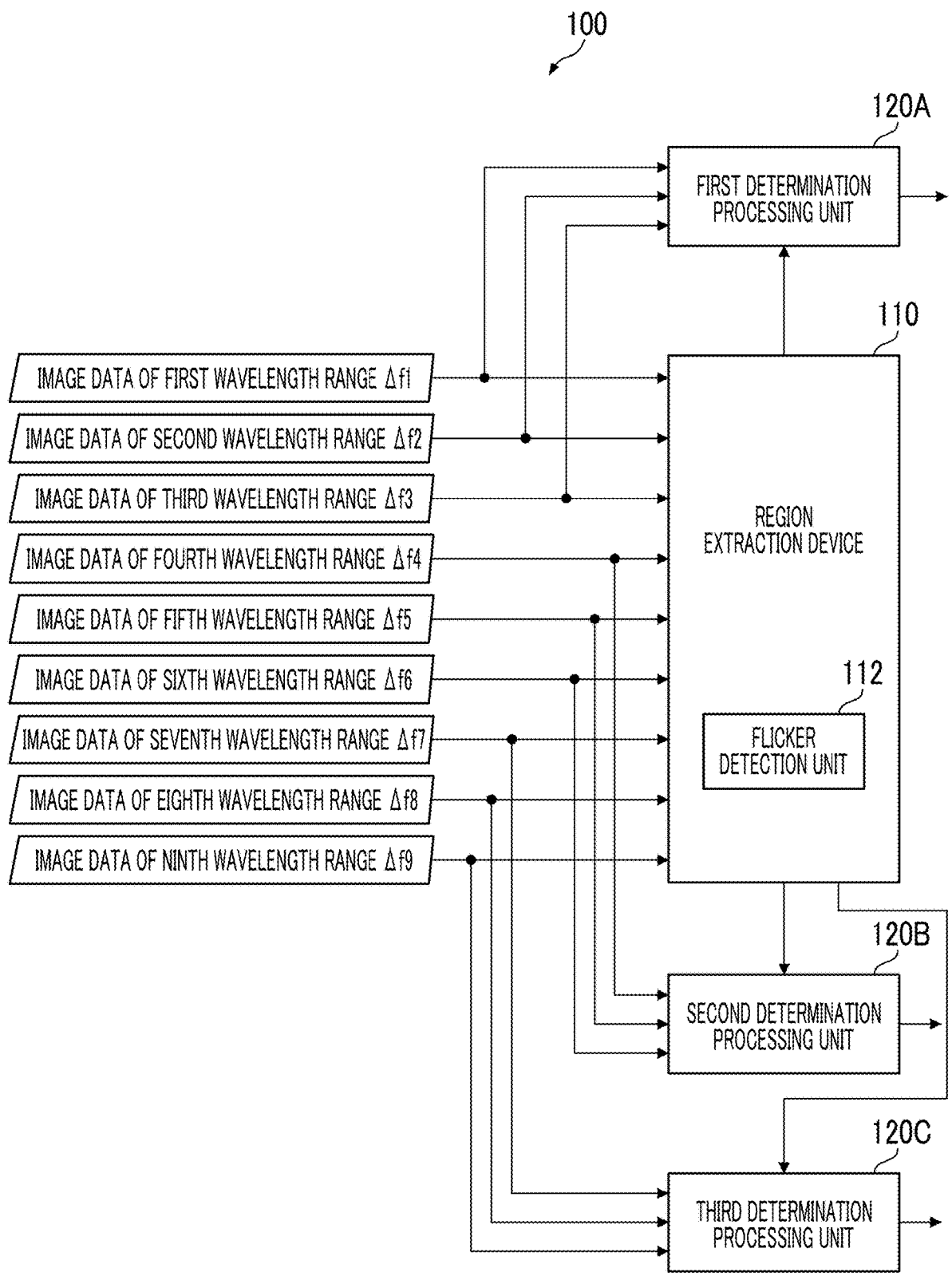
FIG. 14 is a schematic diagram illustrating an embodiment of a processor.

FIG. 14 is a schematic diagram illustrating an embodiment of the processor.

The processor 100 illustrated in FIG. 14 includes a central processing unit (CPU) and a dedicated electric circuit or the like that performs a specific type of signal processing on the image data. The processor 100 functions as the region extraction device that acquires the nine pieces of image data of the first wavelength range Δf1 to the ninth wavelength range Δf9 from the multispectral camera 10 and extracts a region having a possibility of presence of the target object as the determination region based on the nine pieces of image data. In addition, the processor 100 performs determination processing (processing of detecting the target object) of determining whether or not an object in the extracted determination region is the target object.

The processor 100 comprises a region extraction device 110, a first determination processing unit 120A, a second determination processing unit 120B, and a third determination processing unit 120C.

The region extraction device 110 performs image acquisition processing of acquiring a plurality of (nine) pieces of image data of the first wavelength range Δf1 to the ninth wavelength range Δf9 from the multispectral camera 10. Next, a region that emits light having a light emission spectrum other than a light emission spectrum of light emitted by the target object in an imaging region is detected based on image data of other than a wavelength range of the light emission spectrum of light emitted by the target object among the acquired nine pieces of image data. The detected region is decided as a non-determination region in which the target object is not present, and determination region extraction processing of extracting one or a plurality of regions excluding the non-determination region from the imaging region as the determination region is performed.

The target object of the present example is the blue signal lamp, the yellow signal lamp, and the red signal lamp of the traffic signal configured with the LEDs.

In a case of detecting the blue signal lamp that is turned on, the region extraction device 110 performs non-determination region decision processing of deciding a region in which the blue signal lamp which is turned on is not present, as the non-determination region based on six pieces of image data of the fourth wavelength range $\Delta f4$ to the ninth wavelength range $\Delta f9$ that do not include or approximately not include a light emission spectrum of the blue signal lamp among the nine pieces of image data of the first wavelength range $\Delta f1$ to the ninth wavelength range $\Delta f9$.

For example, for a certain pixel Pj of the imaging region, six pieces of pixel data at a position of the pixel Pj are obtained from the six pieces of image data of the fourth wavelength range $\Delta f4$ to the ninth wavelength range $\Delta f9$ which do not include or approximately not include the light emission spectrum of the blue signal lamp among the nine pieces of image data. However, in a case where any one piece of pixel data that exceeds a threshold value is present among the six pieces of pixel data, the pixel Pi is determined as a pixel of a region (non-determination region) in which the blue signal lamp which is turned on is not present. By performing this determination for all pixels of the imaging region, the non-determination region in which the blue signal lamp which is turned on is not present can be determined.

In a case where the non-determination region in which the blue signal lamp which is turned on is not present is decided in the above manner, the region extraction device 110 extracts one or a plurality of regions excluding the non-determination region from the imaging region as the determination region (first determination region) having a possibility of presence of the blue signal lamp which is turned on.

Similarly, in a case of determining the non-determination region in which the yellow signal lamp that is turned on is not present, the region extraction device 110 determines the non-determination region in which the yellow signal lamp which is turned on is not present, based on five pieces of image data of the first wavelength range $\Delta f1$ to the third wavelength range $\Delta f3$, the eighth wavelength range $\Delta f8$, and the ninth wavelength range $\Delta f9$ that do not include or approximately not include a light emission spectrum of the yellow signal lamp. In a case where the non-determination region in which the yellow signal lamp which is turned on is not present is determined, the region extraction device 110 extracts one or a plurality of regions excluding the non-determination region from the imaging region as the determination region (second determination region) having a possibility of presence of the yellow signal lamp which is turned on.

In addition, in a case of determining the non-determination region in which the red signal lamp that is turned on is not present, the region extraction device 110 determines the non-determination region in which the red signal lamp which is turned on is not present, based on five pieces of image data of the first wavelength range $\Delta f1$ to the fifth wavelength range $\Delta f5$ that do not include or approximately not include a light emission spectrum of the red signal lamp. In a case where the non-determination region in which the red signal lamp which is turned on is not present is determined, the region extraction device 110 extracts one or a plurality of regions excluding the non-determination region from the imaging region as the determination region (third determination region) having a possibility of presence of the red signal lamp which is turned on.

The region extraction device 110 outputs first region information indicating the first determination region extracted in the above manner to the first determination processing unit 120A, outputs second region information indicating the second determination region to the second determination processing unit 120B, and outputs third region information indicating the third determination region to the third determination processing unit 120C.

The first determination processing unit 120A, the second determination processing unit 120B, and the third determination processing unit 120C determine whether or not an object in the first determination region, an object in the second determination region, and an object in the third determination region, respectively, are the target object (the blue signal lamp, the yellow signal lamp, and the red signal lamp which are turned on).

Determination Processing Unit

Figure 15:
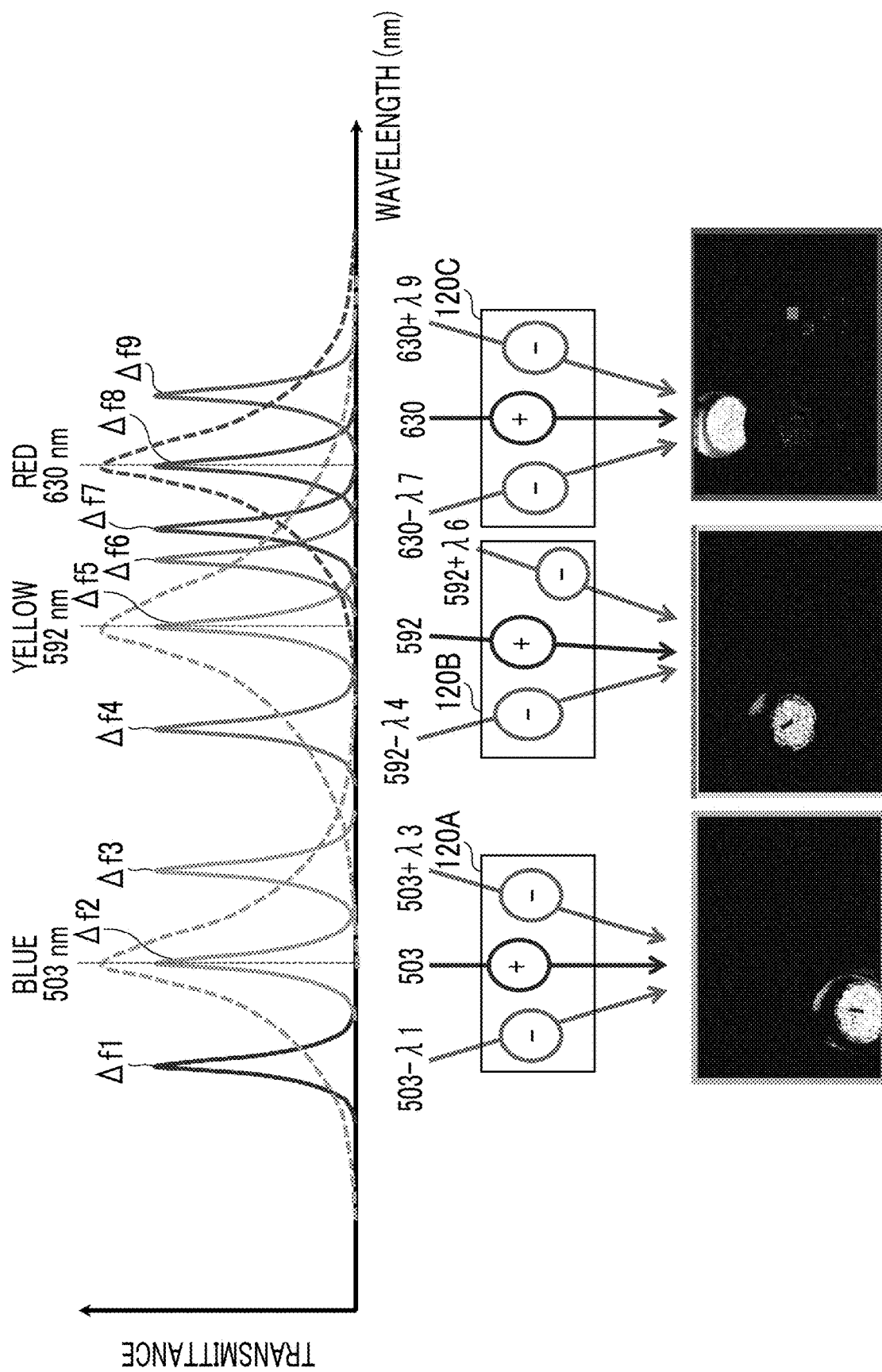
FIG. 15 is a conceptual diagram illustrating an embodiment of determination processing performed by each determination processing unit.

FIG. 15 is a conceptual diagram illustrating an embodiment of determination processing performed by each determination processing unit.

Three pieces of image data of the first wavelength range $\Delta f1$ to the third wavelength range $\Delta f3$ and the first region information are input into the first determination processing unit 120A. The first determination processing unit 120A determines whether or not the object in the first determination region is the target object (blue signal lamp which is turned on) based on the three pieces of image data of the first wavelength range $\Delta f1$ to the third wavelength range $\Delta f3$ and the first region information.

In the object in the first determination region, it is considered that not only the blue signal lamp which is turned on but also another light emitting object or a reflecting object emitting blue light are present.

While the light is blue, the other light emitting object or the reflecting object emitting blue light does not emit light of a narrowband having a central wavelength of 503 nm and a wavelength width of approximately 30 to 50 nm unlike the blue LED.

Therefore, the first determination processing unit 120A subtracts the image data of the first wavelength range $\Delta f1$ and the image data of the third wavelength range $\Delta f3$ that are preceding and succeeding wavelength ranges of the second wavelength range $\Delta f2$, from the image data of the second wavelength range $\Delta f2$ of which the central wavelength matches the central wavelength of the blue LED, and determines whether or not the object in the first determination region is the target object (blue signal lamp of the blue LED) based on a subtraction result.

In a case where the object in the first determination region is the blue signal lamp, the subtraction result is not significantly decreased. However, in a case of the other light emitting object or the reflecting object not having the light emission spectrum of the blue LED, the subtraction result is significantly decreased or becomes negative. Accordingly, from the subtraction result, the first determination processing unit 120A can determine whether or not the object in the first determination region is the blue signal lamp which is turned on.

Similarly, three pieces of image data of the fourth wavelength range $\Delta f4$ to the sixth wavelength range $\Delta f6$ and the second region information are input into the second determination processing unit 120B. The second determination processing unit 120B determines whether or not the object in the second determination region is the target object (yellow signal lamp which is turned on) based on the three pieces of image data of the fourth wavelength range Δf4 to the sixth wavelength range Δf6 and the second region information.

In addition, three pieces of image data of the seventh wavelength range Δf7 to the ninth wavelength range Δf9 and the third region information are input into the third determination processing unit 120C. The third determination processing unit 120C determines whether or not the object in the third determination region is the target object (red signal lamp which is turned on) based on the three pieces of image data of the seventh wavelength range Δf7 to the ninth wavelength range Δf9 and the third region information.

According to the present invention, by performing pre-processing of deciding a region in which the target object is not present as the non-determination region and extracting a region excluding the non-determination region from the imaging region as the determination region by the region extraction device 110, a "false object" in the non-determination region is originally excluded from a determination target. Thus, it is possible to eliminate erroneous detection (suppression of erroneous detection). In addition, since the number of determination regions is decreased (carefully selected) in the imaging region, a processing time period of the determination processing of the target object can be shortened.

In addition, in the determination processing of the target object in the determination region, the "false object" that emits light having a light emission spectrum of a first narrowband but has a wider band of light emission than the first narrowband is excluded by using images of a plurality of narrowbands including a second narrowband corresponding to the first narrowband and a third narrowband (in the present example, preceding and succeeding narrowbands) different from the second narrowband for the target object emitting light having the light emission spectrum of the first narrowband. Accordingly, only the target object can be detected.

A position of the target object (in the present example, a signal lamp of the traffic signal that is turned on) detected by the processor 100 in the imaging region and information about a color of the signal lamp which is turned on are output to an output destination 200. A surveillance system, an automatic driving system, and the like that use information about the traffic signal are considered as the output destination 200.

Figure 16:
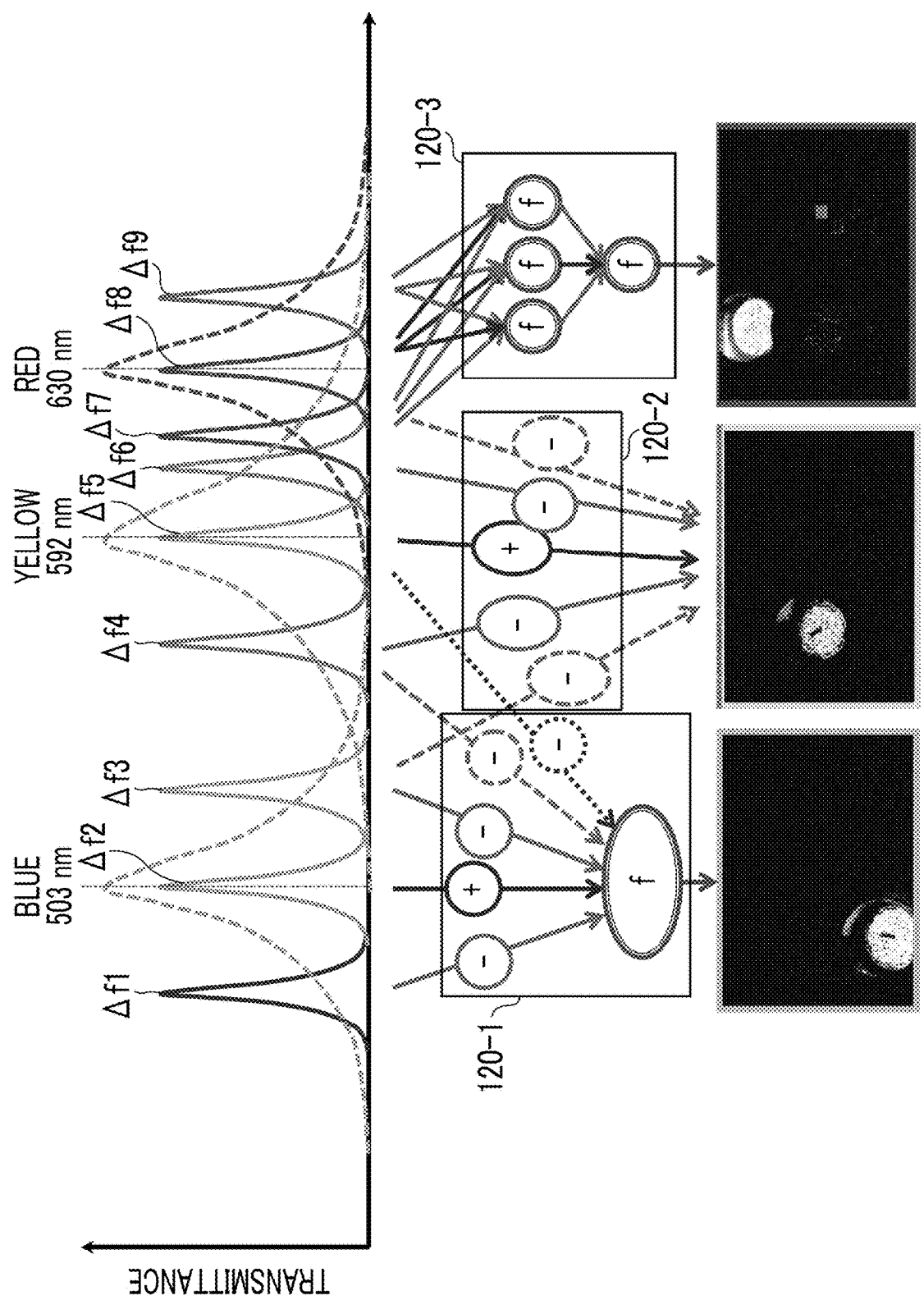
FIG. 16 is a conceptual diagram illustrating another modification example of the determination processing units.

FIG. 16 is a conceptual diagram illustrating another modification example of the determination processing units.

A first determination processing unit 120-1 illustrated in FIG. 16 determines whether or not the object in the first determination region is the blue signal lamp but uses five pieces of image data of the first wavelength range Δf1 to the fifth wavelength range Δf5 in the first determination region. That is, by using the image data of the second wavelength range Δf2 of which the central wavelength matches the central wavelength of the blue LED, the image data of the first wavelength range Δf1 and the image data of the third wavelength range Δf3 which are the preceding and succeeding wavelength ranges of the second wavelength range Δf2, and also the image data of the fourth wavelength range Δf4 and the image data of the fifth wavelength range Δf5, the first determination processing unit 120-1 subtracts two or more pieces of image data (four pieces of image data of the first wavelength range Δf1 and the third wavelength range Δf3 to the fifth wavelength range Δf5) excluding the image data of the second wavelength range Δf2 from the image data of the second wavelength range Δf2, performs non-linear processing on a subtraction result using a non-linear function (f), and determines whether or not the object in the first determination region is the blue signal lamp based on a result of the non-linear processing.

For example, binarization processing based on a threshold value for the subtraction result is considered as a non-linear operation.

A second determination processing unit 120-2 illustrated in FIG. 16 determines whether or not the object in the second determination region is the yellow signal lamp, and five pieces of image data are input in the same manner as the first determination processing unit 120-1. That is, by using the image data of the fifth wavelength range Δf5 of which the central wavelength matches the central wavelength of the yellow LED, the image data of the fourth wavelength range Δf4 and the image data of the sixth wavelength range Δf6 which are the preceding and succeeding wavelength ranges of the fifth wavelength range Δf5, and furthermore, the image data of the third wavelength range Δf3 and the image data of the seventh wavelength range Δf7 adjacent on an outer side, the second determination processing unit 120-2 subtracts two or more pieces of image data (four pieces of image data of the third wavelength range Δf3, the fourth wavelength range Δf4, the sixth wavelength range Δf6, and the seventh wavelength range Δf7) excluding the image data of the fifth wavelength range Δf5 from the image data of the fifth wavelength range Δf5, and determines whether or not the object in the second determination region is the yellow signal lamp based on a subtraction result.

A sum-product operation may be performed using three or more pieces of image data (five pieces of image data of the third wavelength range Δf3 to the seventh wavelength range Δf7) including the image data of the fifth wavelength range Δf5 in the second determination region and a weight coefficient set for each image (each of the five pieces of image data), and a determination as to whether or not the object in the second determination region is the yellow signal lamp may be performed based on an operation result of the sum-product operation.

In each of the determination processing units 120-1 and 120-2, by not only simply subtracting images of preceding and succeeding adjacent wavelength ranges from an image of a wavelength range corresponding to the target object but also using images of more wavelength ranges, recognition accuracy of the target object is improved.

A third determination processing unit 120-3 determines whether or not the object in the third determination region is the red signal lamp and particularly performs non-linear processing (processing based on a learned model).

For example, the learned model can be configured with a convolutional neural network and is machine-learned in advance using a learning dataset consisting of a learning image for each of a plurality of wavelength ranges and answer data.

In the third determination processing unit 120-3, the image data of the eighth wavelength range Δf8 that is image data of the third determination region and of which the central wavelength matches the central wavelength of the red LED, and the image data of the seventh wavelength range Δf7 and the image data of the ninth wavelength range Δf9 that are the preceding and succeeding wavelength ranges of the eighth wavelength range Δf8 are input, and a recognition result indicating whether or not the object in the third determination region is the red signal lamp is output.

While the determination processing units 120-1 to 120-3 determine whether or not the objects in the first determination region, the second determination region, and the third determination region are the blue signal lamp, the yellow signal lamp, and the red signal lamp, respectively, for convenience of description, a determination of other color signal lamps can also be performed by each other by changing input image data of a plurality of wavelength ranges.

Figure 17:
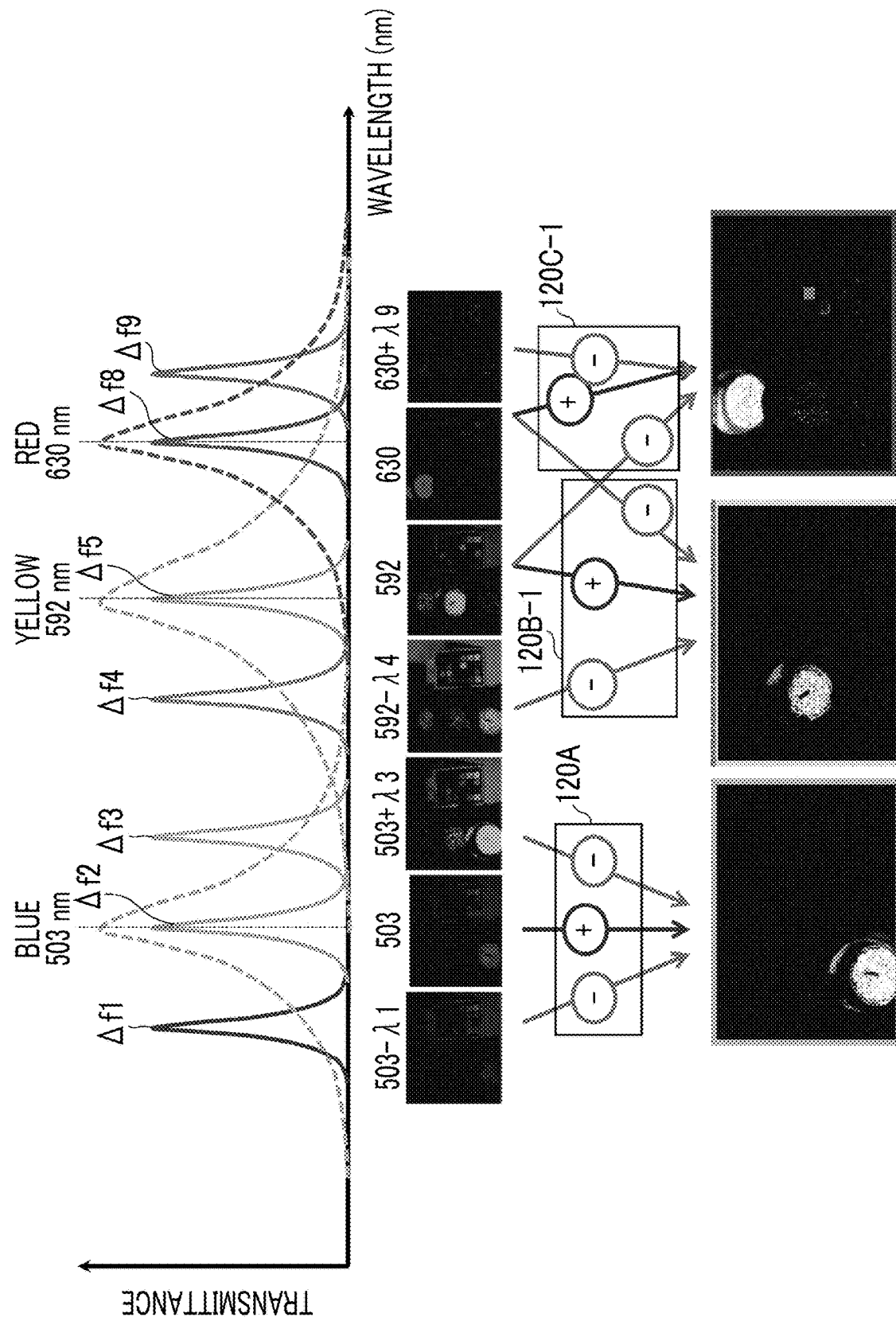
FIG. 17 is a conceptual diagram illustrating a modification example of the multispectral camera and the determination processing units.

FIG. 17 is a conceptual diagram illustrating a modification example of the multispectral camera and the determination processing units.

While the multispectral camera 10 captures nine pieces of image data of the first wavelength range $\Delta f1$ to the ninth wavelength range $\Delta f9$, a multispectral camera that captures seven pieces of image data of the first wavelength range $\Delta f1$ to the fifth wavelength range $\Delta f5$, the eighth wavelength range $\Delta f8$, and the ninth wavelength range $\Delta f9$ excluding the sixth wavelength range $\Delta f6$ having a central wavelength of 592 nm+$\lambda 6$ and the seventh wavelength range $\Delta f7$ having a central wavelength of 630 nm−$\lambda 7$ as illustrated in FIG. 17.

In a case of capturing the image data of the seven wavelength ranges, a second determination processing unit 120B-1 that determines whether or not the object in the second determination region is the yellow signal lamp performs the determination processing using three pieces of image data of the fourth wavelength range $\Delta f4$, the fifth wavelength range $\Delta f5$, and the eighth wavelength range $\Delta f8$. In the same manner as the second determination processing unit 120B, the second determination processing unit 120B-1 subtracts the image data of the fourth wavelength range $\Delta f4$ and the image data of the eighth wavelength range $\Delta f8$ that are preceding and succeeding wavelength ranges of the fifth wavelength range $\Delta f5$, from the image data of the fifth wavelength range $\Delta f5$ of which the central wavelength matches the central wavelength of the yellow LED, and determines whether or not the object in the second determination region is the target object (yellow signal lamp of the yellow LED) based on a subtraction result.

In addition, a third determination processing unit 120C-1 that determines whether or not the object in the third determination region is the red signal lamp performs the determination processing using three pieces of image data of the fifth wavelength range $\Delta f5$, the eighth wavelength range $\Delta f8$, and the ninth wavelength range $\Delta f9$. In the same manner as the third determination processing unit 120C, the third determination processing unit 120C-1 subtracts the image data of the fifth wavelength range $\Delta f5$ and the image data of the ninth wavelength range $\Delta f9$ that are preceding and succeeding wavelength ranges of the eighth wavelength range $\Delta f8$, from the image data of the eighth wavelength range $\Delta f8$ of which the central wavelength matches the central wavelength of the red LED, and determines whether or not the object in the third determination region is the target object (red signal lamp of the red LED) based on a subtraction result.

While the multispectral camera preferably captures image data of seven wavelength ranges in the above manner, the multispectral camera may capture images of a plurality of narrowbands including three narrowbands corresponding to the light emission spectra of light emitted by the blue signal lamp, the yellow signal lamp, and the red signal lamp, respectively, and three or more narrowbands different from the three narrowbands. In addition, the processor may detect which signal lamp of the traffic signal emits light based on images of six or more narrowbands.

In addition, the region extraction device 110 illustrated in FIG. 4 comprises a flicker detection unit 112 and can use a detection result of the flicker detection unit 112 in extraction of the first determination region, the second determination region, and the third determination region.

In recent years, the red LED has been generally used in a brake lamp of an automobile. In this case, it is difficult to exclude the brake lamp (false object) of the red LED.

The flicker detection unit 112 is used for excluding the false object such as the brake lamp of the red LED.

The brake lamp of the red LED of the automobile is turned on by a direct current power supply and thus, emits light at a constant brightness level. Meanwhile, the red LED or the like of the traffic signal is turned on by a commercial power supply and thus, is affected by a frequency (50 Hz or 60 Hz) of the commercial power supply, and a flicker having a frequency corresponding to the frequency of the commercial power supply occurs.

Therefore, the multispectral camera 10 captures image data (motion picture image data) of each wavelength range at a frame rate (frames per second (fps)) different from a flicker frequency of the red LED or the like of the traffic signal.

The flicker detection unit 112 detects a region (region in which the flicker does not occur) in which the brightness level does not change in consecutive frames, based on the input motion picture image data of each wavelength range.

The region extraction device 110 sets the region in which the blue signal lamp which is turned on is not present, and the region in which the flicker does not occur, as the non-determination region and extracts a region excluding the non-determination region from the imaging region as the first determination region.

Similarly, the region extraction device 110 sets the region in which the yellow signal lamp which is turned on is not present, and the region in which the flicker does not occur, as the non-determination region and sets a region excluding the non-determination region from the imaging region as the second determination region. In addition, the region extraction device 110 sets the region in which the red signal lamp which is turned on is not present, and the region in which the flicker does not occur, as the non-determination region and extracts a region excluding the non-determination region from the imaging region as the third determination region.

Accordingly, the object in each determination region is limited to an object that causes the flicker, and it is possible to not detect the brake lamp or the like of the automobile consisting of the red LED in a case of detecting, for example, the red signal lamp of the red LED.

As a method of excluding the false object such as the brake lamp of the red LED, the region extraction device 110 can set a region of less than or equal to lower one-third of the imaging region as the non-determination region. In a case where the multispectral camera 10 is a vehicle-mounted camera, the traffic signal is not present in the region of less than or equal to lower one-third of the imaging region imaged by the vehicle-mounted camera. Meanwhile, it is considered that the brake lamp or the like of the automobile is not present in a region of upper two-third of the imaging region. In this case, each determination region is limited to an inside of the region of upper two-third of the imaging region, and the processing time period can be shortened.

Object Detection Method

Figure 18:
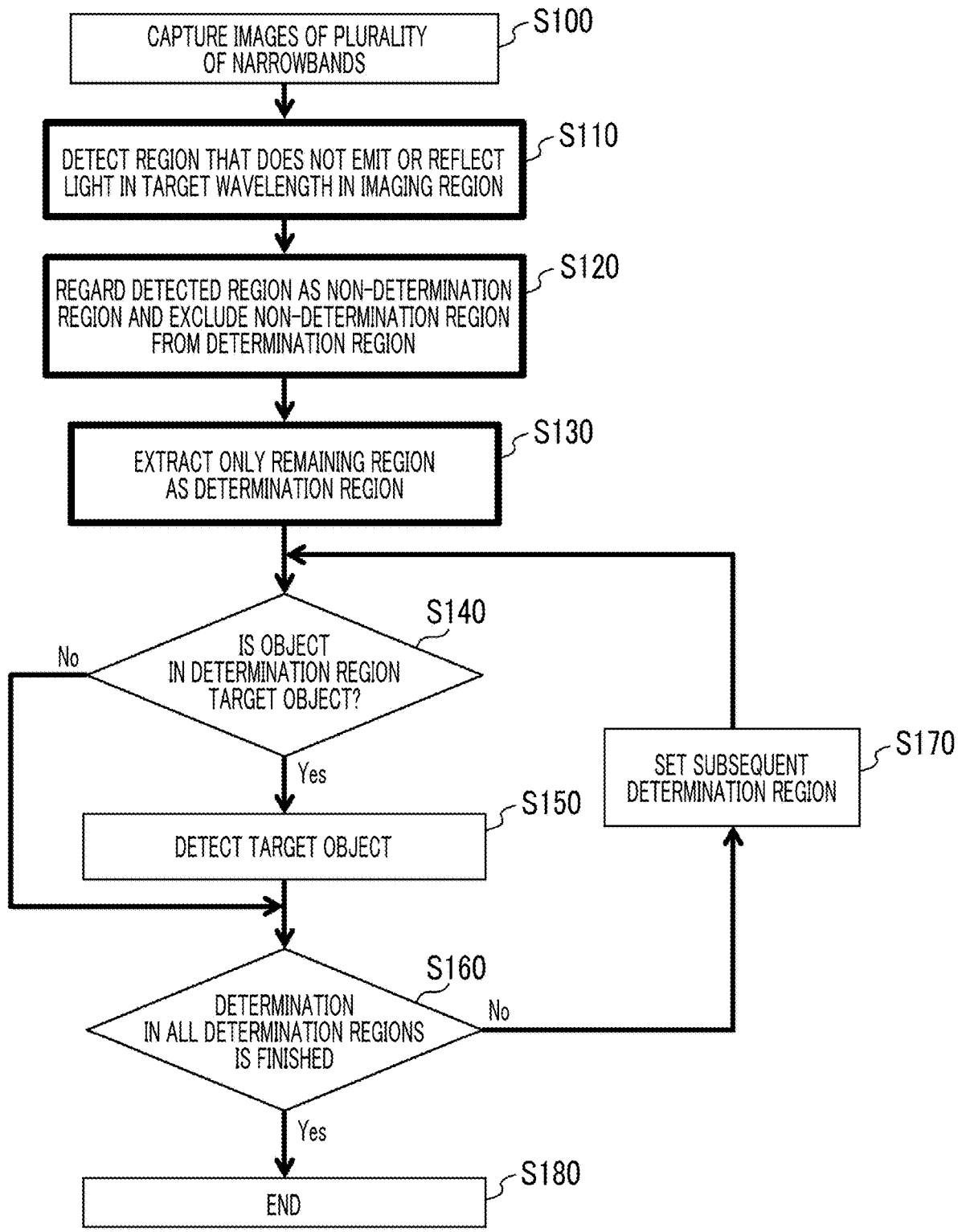
FIG. 18 is a flowchart illustrating an embodiment of an object detection method according to the embodiment of the present invention.
Figure 19:
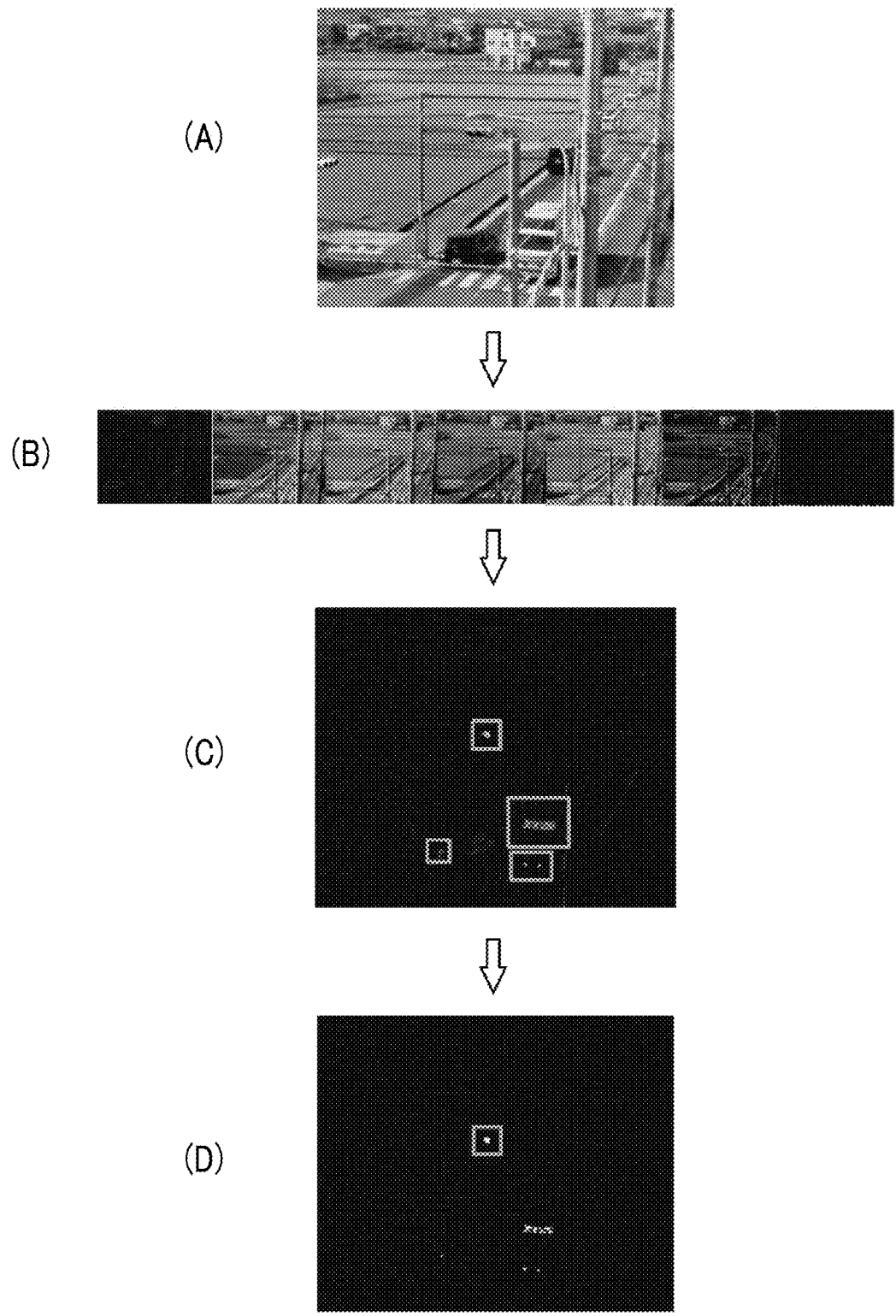
FIG. 19 is a diagram illustrating various images and the like during detection of a target object according to the embodiment of the present invention.

FIG. 18 is a flowchart illustrating an embodiment of an object detection method according to the embodiment of the present invention, and FIG. 19 is a diagram illustrating various images and the like during detection of the target object according to the embodiment of the present invention. The object detection method illustrated in FIG. 18 includes a region extraction method of extracting the region having the possibility of presence of the target object as the determination region according to the embodiment of the present invention.

In FIG. 18, the images of the plurality of narrowbands are acquired by the multispectral camera 10 (step S100).

Here, (A) of FIG. 19 illustrates an image of a wideband of visible light, and (B) of FIG. 19 illustrates seven images of different narrowbands. In the present example, as illustrated in FIG. 17, seven images of the first wavelength range $\Delta f1$ to the fifth wavelength range $\Delta f5$, the eighth wavelength range $\Delta f8$, and the ninth wavelength range $\Delta f9$ are acquired.

The processor 100 acquires a plurality of images of different narrowbands from the multispectral camera 10 and processes each step below.

While a case of using the red signal lamp of the red LED which is turned on as the target object will be described for simplification of description, the same processing is performed in a case of using the blue signal lamp of the blue LED which is turned on, and the yellow signal lamp of the yellow LED which is turned on as the target object.

The region extraction device 110 of the processor 100 detects a region that does not emit or reflect light in the wavelength range of the target object based on the plurality of images (step S110). The narrowbands other than the wavelength range of the target object of the present example are the first wavelength range $\Delta f1$ to the fifth wavelength range $\Delta f5$. Thus, in five images of these narrowbands, in a case where any one piece of pixel data exceeding the threshold value is present, the pixel is not a pixel including the target object. By performing this determination for all pixels of the imaging region, a region in which the target object is not present in the imaging region is detected.

The region detected as the region in which the target object is not present is regarded as the non-determination region and excluded from the determination region (step S120). The region extraction device 110 extracts only the remaining region excluding the non-determination region from the imaging region as the determination region (step S130).

Here, (C) of FIG. 19 illustrates the determination region extracted in the above manner. In (C) of FIG. 19, a determination region (third determination region) illustrated by a white rectangular frame indicates a region having a possibility of presence of the red signal lamp which is turned on. In the present example, four determination regions are extracted.

Next, the determination processing unit (third determination processing unit 120C-1 in FIG. 17) determines whether or not the object in the determination region is the target object (step S140). That is, as described using the third determination processing unit 120C-1 and FIG. 17, the image data of the fifth wavelength range $\Delta f5$ and the image data of the ninth wavelength range $\Delta f9$ which are the preceding and succeeding wavelength ranges of the eighth wavelength range $\Delta f8$ are subtracted from the image data of the eighth wavelength range $\Delta f8$ of which the central wavelength matches the central wavelength of the red LED, and whether or not the object in the determination region is the target object (red signal lamp of the red LED) is determined based on the subtraction result.

In a case where it is determined that the object in the determination region is the target object (in a case of "Yes"), the object in the determination region is detected as the target object, and a detection result is output to the output destination 200 (step S150). Meanwhile, in a case where it is determined that the object in the determination region is not the target object (in a case of "No"), a transition is made to step S160.

In step S160, a determination as to whether or not the determination processing in all determination regions is finished is performed. In a case where the determination processing in all determination regions is not finished (in a case of "No"), a transition is made to step S170, and the subsequent determination region is set. In a case where the subsequent determination region is set, a return is made to step S140, and processing of each of step S140 to step S160 is performed again for the subsequent determination region.

In a case where the determination processing in all determination regions is finished in such a manner, detection of the target object based on images obtained by imaging performed once is finished.

Here, (D) of FIG. 19 is a diagram illustrating the determination region in which it is determined that the target object is present, and the target object and the like in the determination region.

In (D) of FIG. 19, the determination region in which it is determined that the target object is present is represented by a white frame, and the target object in the determination region is represented in white. In the present example, as illustrated in (D) of FIG. 19, presence of one target object (red signal lamp of the red LED which is turned on) at a position illustrated by a white frame in the imaging region is detected.

According to the present invention, since the determination region having the possibility of presence of the target object is carefully selected as illustrated by the white frame in (C) of FIG. 19, a load in the determination processing unit is small. In addition, since the "false object" present in the non-determination region is originally excluded from the determination target, erroneous detection can be suppressed.

Comparative Example

Figure 20:
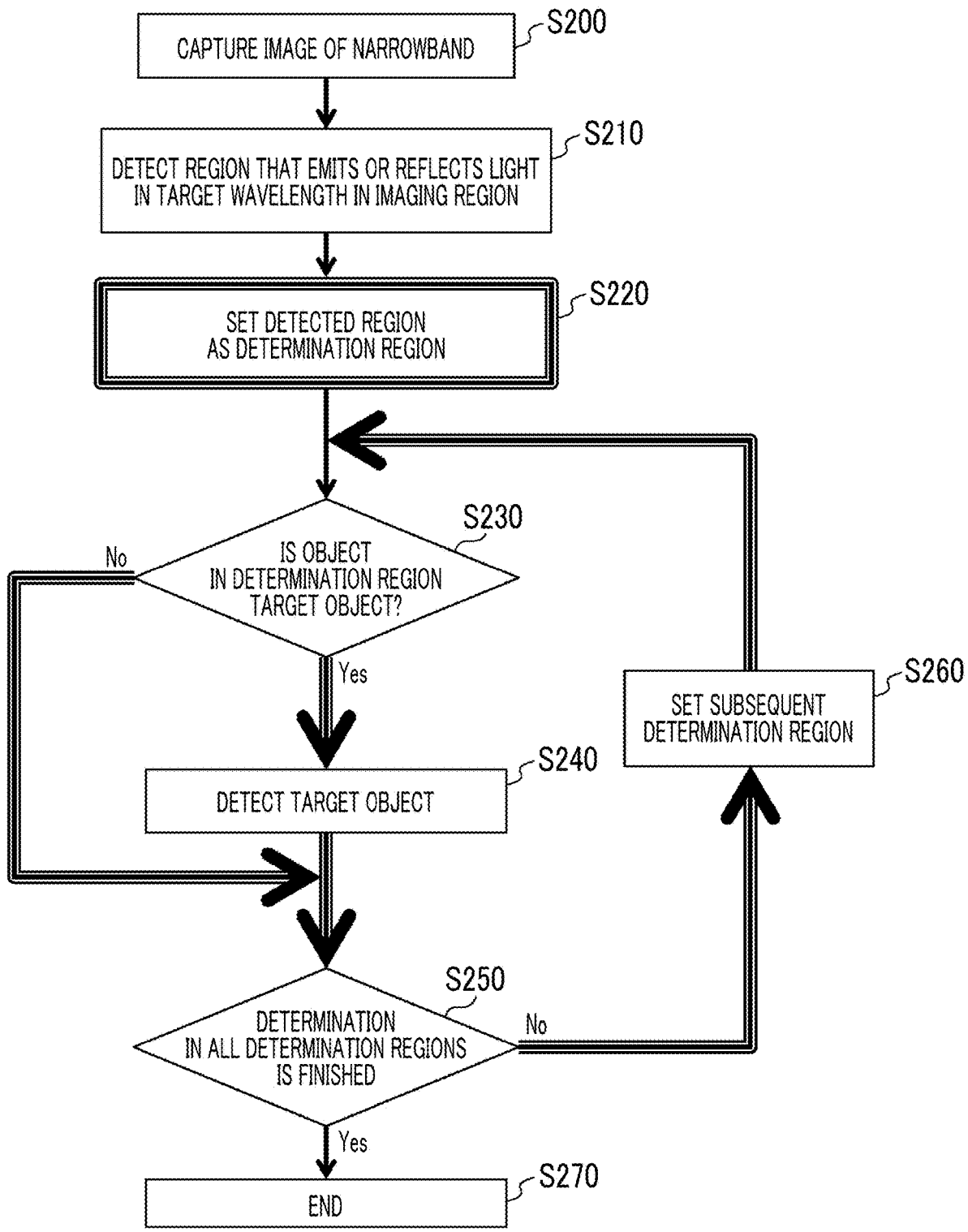
FIG. 20 is a flowchart illustrating a comparative example of the object detection method according to the embodiment of the present invention.

FIG. 20 is a flowchart illustrating a comparative example of the object detection method according to the embodiment of the present invention, and FIG. 21 is a diagram illustrating various images and the like during detection of the target object according to the comparative example.

In FIG. 20, an image of a narrowband that is the wavelength range of the target object is captured (step S200). In the comparative example, the red signal lamp of the red LED which is turned on is used as the target object. Thus, the wavelength range of the target object is the eighth wavelength range $\Delta f8$.

Here, (A) of FIG. 21 illustrates an image of a wideband of visible light, and (B) of FIG. 21 illustrates an image of a narrowband (eighth wavelength range $\Delta f8$). While the image illustrated in (B) of FIG. 21 is the image of the narrowband, many other objects that emit or reflect light of bands other than the narrowband are captured.

Next, a region that emits or reflects light in the wavelength range of the target object is detected based on the captured image of the narrowband (step S210). For example, in the image of the narrowband, a region of a pixel group exceeding the threshold value can be detected as the region emitting or reflecting light in the wavelength range of the target object.

The region detected in step S210 is set as the determination region (step S220). Here, (C) of FIG. 21 illustrates the determination region set in the above manner. In (C) of FIG. 21, a region illustrated by a white rectangular frame is the determination region. The number of set determination regions illustrated in (C) of FIG. 21 is greater than the number of determination regions illustrated in (C) of FIG. 19. This is because the non-determination region in which the target object is apparently not present is not excluded. For example, a region of an object of which an object color is white also reflects light of the wavelength range of the target object and thus, is set as the determination region.

Next, a determination as to whether or not the object in the determination region is the target object is performed (step S230). Here, the determination as to whether or not the object is the target object can be performed using image recognition processing. For example, in a case where the target object is a signal lamp of the traffic signal that emits light, a shape of the object is circular or approximately circular. Accordingly, in a case where the shape of the object in the determination region coincides with a shape of the target object, the object can be recognized as the target object. In addition, in a case where a shape of a vicinity including the determination region represents a shape of the traffic signal (for example, in a case where three signal lamps of blue, yellow, and red are lined up), the detected object can be recognized as the signal lamp of the traffic signal.

In a case where it is determined that the object in the determination region is the target object (in a case of "Yes"), the object in the determination region is detected as the target object (step S240). Meanwhile, in a case where it is determined that the object in the determination region is not the target object (in a case of "No"), a transition is made to step S250.

In step S250, a determination as to whether or not the determination processing in all determination regions is finished is performed. In a case where the determination processing in all determination regions is not finished (in a case of "No"), a transition is made to step S260, and the subsequent determination region is set. In a case where the subsequent determination region is set, a return is made to step S230, and processing of each of step S230 to step S250 is performed again for the subsequent determination region.

In a case where the determination processing in all determination regions is finished in such a manner, detection of the target object based on images obtained by imaging performed once is finished.

Here, (D) of FIG. 21 is a diagram illustrating the determination region in which it is determined that the target object is present, and the target object and the like in the determination region.

In (D) of FIG. 21, the determination region in which it is determined that the target object is present is represented by a white frame, and the target object in the determination region is represented in white. In the present example, as illustrated in (D) of FIG. 21, presence of two target objects at positions illustrated by a white frame in the imaging region is detected.

According to the comparative example, since many determination regions are set, a load on recognition processing as to whether or not the target object is present in each determination region is increased. In addition, many "false objects" that generate or reflect light of a wideband such as white light including the narrowband generated or reflected by the target object are present in the determination region. Consequently, a possibility that the "false objects" are erroneously detected as the target object is increased. According to a determination result of the determination of the comparative example, while the target object is detected in an approximately center portion of the imaging region, the "false object" is detected in a lower left region of the imaging region as illustrated in (D) of FIG. 21.

Others

While the blue signal lamp, the yellow signal lamp, and the red signal lamp of the traffic signal configured with the LEDs are used as the target object in the present embodiment, the target object is not limited thereto, and the number of target objects may be one. For example, a lead-in lamp disposed on a runway of an airport, an LED road stud, or other reflecting objects that reflect only light of a narrowband may be used as the target object.

In addition, the number of images of the narrowbands captured at the same time by the multispectral camera is not limited to the present embodiment. The multispectral camera may include a plurality of narrowband filters that selectively allow transmission of light of a plurality of narrowbands, respectively, including at least the second narrowband corresponding to the wavelength range (first narrowband) emitted by the target object and the third narrowband different from the second narrowband, and acquire a plurality of images respectively transmitted through the plurality of narrowband filters at the same time. In a case where the interference does not occur among the plurality of images acquired at the same time from the image sensor of the multispectral camera, processing of removing the interference is not necessary.

In addition, in the present embodiment, for example, a hardware structure of a processing unit such as a CPU executing various types of processing includes various processors illustrated below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacturing, and a dedicated electric circuit or the like such as an application specific integrated circuit (ASIC) that is a processor having a circuit configuration dedicatedly designed to execute a specific type of processing.

One processing unit may be configured with one of the various processors or may be configured with a combination of two or more processors of the same type or different types (for example, a plurality of FPGAs or a combination of the CPU and the FPGA). In addition, a plurality of processing units may be configured with one processor. As an example of configuring the plurality of processing units with one processor, first, as represented by a computer such as a client or a server, a form of configuring one processor with a combination of one or more CPUs and software and causing the processor to function as the plurality of processing units is available. Second, as represented by a system on chip (SoC) or the like, a form of using a processor that implements functions of the entire system including the plurality of processing units using one integrated circuit (IC) chip is available. Accordingly, various processing units are configured with one or more of the various processors as the hardware structure.

Furthermore, the hardware structure of those various processors is more specifically an electric circuit (circuitry) in which circuit elements such as semiconductor elements are combined.

In addition, the present invention is not limited to the embodiment and can be subjected to various modifications without departing from a spirit of the present invention.

EXPLANATION OF REFERENCES

1: object detection apparatus
10: multi spectral camera

11: imaging optical system
12: lens
14: pupil division filter
16: narrowband filter
18: polarization filter
20: image sensor
21: pixel array layer
22: photodiode
23: polarization filter element array layer
24A: first polarization filter element
24B: second polarization filter element
24C: third polarization filter element
25: spectroscopic filter element array layer
26: spectroscopic filter element
26A: first spectroscopic filter element
26B: second spectroscopic filter element
26C: third spectroscopic filter element
27: microlens array layer
28: microlens
30: signal processing unit
30A: analog signal processing unit
30B: image generation unit
30C: coefficient storage unit
100: processor
110: region extraction device
112: flicker detection unit
120A, 120-1: first determination processing unit
120B, 120B-1, 120-2: second determination processing unit
120C, 120C-1, 120-3: third determination processing unit
200: output destination
F1: first narrowband filter unit
F2: second narrowband filter unit
F3: third narrowband filter unit
F4: fourth narrowband filter unit
F5: fifth narrowband filter unit
F6: sixth narrowband filter unit
F7: seventh narrowband filter unit
F8: eighth narrowband filter unit
F9: ninth narrowband filter unit
G1: first polarization filter unit
G2: second polarization filter unit
G3: third polarization filter unit
L: optical axis
P1: first pixel
P2: second pixel
P3: third pixel
P4: fourth pixel
P5: fifth pixel
P6: sixth pixel
P7: seventh pixel
P8: eighth pixel
P9: ninth pixel
PB: pixel block
Pi: i-th pixel
S1: first optical region
S2: second optical region
S3: third optical region
S4: fourth optical region
S5: fifth optical region
S6: sixth optical region
S7: seventh optical region
S8: eighth optical region
S9: ninth optical region
S100 to S170, S200 to S260: step
X1 to X9, x1 to x9, Xj: pixel signal
$\Delta f1$: first wavelength range
$\Delta f2$: second wavelength range
$\Delta f3$: third wavelength range
$\Delta f4$: fourth wavelength range
$\Delta f5$: fifth wavelength range
$\Delta f6$: sixth wavelength range
$\Delta f7$: seventh wavelength range
$\Delta f8$: eighth wavelength range
$\Delta f9$: ninth wavelength range

What is claimed is:

1. A region extraction device comprising:
a hardware processor configured to extract a region having a possibility of presence of a target object as a determination region in an imaging region,
wherein the target object emits light having a light emission spectrum of a first narrowband, and
the hardware processor is configured to perform
image acquisition processing of acquiring a plurality of images including an image of a second narrowband corresponding to the first narrowband and an image of a third narrowband different from the second narrowband from a multispectral camera,
non-determination region decision processing of detecting a region emitting light having a light emission spectrum other than the light emission spectrum of the first narrowband in the imaging region and deciding the detected region as a non-determination region based on images other than the image of the second narrowband among the plurality of images, and
determination region extraction processing of extracting one or a plurality of regions excluding the non-determination region from the imaging region as the determination region, wherein a central wavelength of the second narrowband is within a range of less than a half-width of the light emission spectrum of the first narrowband from a central wavelength of the first narrowband, and a central wavelength of the third narrowband is separated by more than or equal to the half-width of the light emission spectrum of the first narrowband from the central wavelength of the second narrowband.

2. The region extraction device according to claim 1, wherein the central wavelength of the second narrowband matches the central wavelength of the first narrowband, and a bandwidth of the second narrowband is within a bandwidth of the first narrowband.

3. The region extraction device according to claim 1, wherein the target object causes a flicker having a frequency corresponding to a frequency of a commercial power supply, and
in the non-determination region decision processing, a region in which the flicker does not occur in the imaging region is set as the non-determination region.

4. The region extraction device according to claim 1, wherein in the non-determination region decision processing, a region of lower one-third of the imaging region is set as the non-determination region.

5. The region extraction device according to claim 1, wherein the target object is a light emitting object including a light emitting diode.

6. An object detection apparatus comprising:
the region extraction device according to claim 1; and
the multispectral camera,
wherein the hardware processor is configured to perform determination processing of determining whether or not an object in the determination region is the target object based on images of a plurality of narrowbands including the image of the second narrowband and the image of the third narrowband.

7. The object detection apparatus according to claim 6, wherein in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, the image of the third narrowband and the image of the fourth narrowband in the determination region are subtracted from the image of the second narrowband in the determination region, and a determination as to whether or not the object in the determination region is the target object is performed based on a subtraction result obtained by the subtraction.

8. The object detection apparatus according to claim 6, wherein in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, a sum-product operation is performed using the image of the second narrowband, the image of the third narrowband, and the image of the fourth narrowband in the determination region, and a weight coefficient set for each image, and a determination as to whether or not the object in the determination region is the target object is performed based on an operation result obtained by the sum-product operation.

9. The object detection apparatus according to claim 6, wherein in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and in the determination processing, a sum-product operation is performed using the image of the second narrowband, the image of the third narrowband, and the image of the fourth narrowband in the determination region, and a weight coefficient set for each image, a non-linear operation is further performed on an operation result obtained by the sum-product operation, and a determination as to whether or not the object in the determination region is the target object is performed based on a result of the non-linear operation.

10. The object detection apparatus according to claim 6, wherein in the image acquisition processing, the image of the second narrowband, the image of the third narrowband, and an image of a fourth narrowband on an opposite side to the third narrowband with the second narrowband interposed between the third narrowband and the fourth narrowband are acquired from the multispectral camera, and the determination processing is processing based on a learned model that takes input of the image of the second narrowband, the image of the third narrowband, and the image of the fourth narrowband in the determination region and outputs a determination result as to whether or not the object in the determination region is the target object.

11. The object detection apparatus according to claim 6, wherein the target object is a blue signal lamp, a yellow signal lamp, and a red signal lamp of a traffic signal, in the image acquisition processing, images of a plurality of narrowbands including images of three narrowbands respectively corresponding to light emission spectra of light emitted by the blue signal lamp, the yellow signal lamp, and the red signal lamp and images of three or more narrowbands different from the three narrowbands are acquired from the multispectral camera, and the hardware processor is configured to detect which signal lamp of the traffic signal emits light based on images of six or more narrowbands.

12. A region extraction method performed by a hardware processor configured to extract a region having a possibility of presence of a target object as a determination region in an imaging region, the target object emitting light having a light emission spectrum of a first narrowband, the region extraction method comprising:

a step of acquiring a plurality of images including an image of a second narrowband corresponding to the first narrowband and an image of a third narrowband different from the second narrowband from a multispectral camera;

a step of detecting a region emitting light having a light emission spectrum other than the light emission spectrum of the first narrowband in the imaging region and deciding the detected region as a non-determination region based on images other than the image of the second narrowband among the plurality of images; and a step of extracting one or a plurality of regions excluding the non-determination region from the imaging region as the determination region, wherein a central wavelength of the second narrowband is within a range of less than a half-width of the light emission spectrum of the first narrowband from a central wavelength of the first narrowband, and a central wavelength of the third narrowband is separated by more than or equal to the half-width of the light emission spectrum of the first narrowband from the central wavelength of the second narrowband.

13. An object detection method comprising:
the region extraction method according to claim 12,
wherein the hardware processor determines whether or not an object in the determination region is the target object based on images of a plurality of narrowbands including the image of the second narrowband and the image of the third narrowband.

* * * * *